US012646749B2

(12) United States Patent
    Oto et al.

(10) Patent No.: US 12,646,749 B2
(45) Date of Patent: Jun. 2, 2026

(54) BATTERY

(71) Applicant: Panasonic Intellectual Property Management Co., Ltd., Osaka (JP)

(72) Inventors: Takashi Oto, Osaka (JP); Masahisa Fujimoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 551 days.

(21) Appl. No.: 18/342,770

(22) Filed: Jun. 28, 2023

(65) Prior Publication Data

US 2023/0343998 A1 Oct. 26, 2023

Related U.S. Application Data

(63) Continuation of application No. PCT/JP2021/038855, filed on Oct. 21, 2021.

(30) Foreign Application Priority Data

| Jan. 26, 2021 | (JP) | ................................ | 2021-010654 |
| Jan. 26, 2021 | (JP) | ................................ | 2021-010655 |
| Aug. 27, 2021 | (JP) | ................................ | 2021-139376 |

(51) Int. Cl.
    *H01M 10/0562* (2010.01)
    *H01M 4/36* (2006.01)
    (Continued)

(52) U.S. Cl.
    CPC ....... *H01M 10/0562* (2013.01); *H01M 4/366* (2013.01); *H01M 4/505* (2013.01);
    (Continued)

(58) Field of Classification Search
    CPC .. H01M 10/0562; H01M 4/366; H01M 4/505; H01M 4/525; H01M 4/58;
    (Continued)

(56) References Cited

U.S. PATENT DOCUMENTS

| 3,988,164 A | * | 10/1976 | Liang | ...................... | H01M 6/18 |
| | | | | | 429/305 |
| 4,127,708 A | | 11/1978 | Liang et al. | | |

(Continued)

FOREIGN PATENT DOCUMENTS

| JP | 2008-243822 | 10/2008 |
| JP | 2018-129159 | 8/2018 |

(Continued)

OTHER PUBLICATIONS

Singh et al. "Implementation of Bismuth Chalcogenides as an Efficient Anode", 2020, Molecules, vol. 25, 3733, pp. 1-20; retrieved from https://www.mdpi.com/1420-3049/25/16/3733 (Year: 2020).*

(Continued)

*Primary Examiner* — James M Erwin

(74) *Attorney, Agent, or Firm* — WHDA, LLP

(57) ABSTRACT

A battery includes a first electrode, a second electrode, and a solid electrolyte layer disposed between the first electrode and the second electrode, in which the first electrode includes a current collector and an active material layer disposed between the current collector and the solid electrolyte layer, and the active material layer contains Bi as a main component of an active material.

22 Claims, 11 Drawing Sheets

1000

(51) Int. Cl.
H01M 4/505 (2010.01)
H01M 4/525 (2010.01)
H01M 4/58 (2010.01)
H01M 4/66 (2006.01)
*H01M 4/02* (2006.01)
*H01M 10/052* (2010.01)

(52) U.S. Cl.
CPC ............. H01M 4/525 (2013.01); H01M 4/58
(2013.01); H01M 4/661 (2013.01); *H01M 2004/027* (2013.01); *H01M 2004/028* (2013.01); *H01M 10/052* (2013.01); *H01M 2300/008* (2013.01)

(58) Field of Classification Search
CPC .............. H01M 4/661; H01M 10/052; H01M 2004/028; H01M 2300/008
USPC ......................................................... 429/188
See application file for complete search history.

(56) References Cited

U.S. PATENT DOCUMENTS 4,299,890 A * 11/1981 Rea ................... H01M 10/0562
429/231.95

2012/0315538 A1 * 12/2012 Chiang .................. H01M 4/13
264/43
2018/0226633 A1 8/2018 Fujiki et al.
2019/0088995 A1 3/2019 Asano et al.
2019/0260065 A1 8/2019 Yashiro et al.
2021/0020996 A1 1/2021 Cui et al.

FOREIGN PATENT DOCUMENTS

JP 2019-140054 8/2019
JP 2019-145299 8/2019
WO 2001/029912 4/2001
WO 2018/025582 2/2018

OTHER PUBLICATIONS

Xianming et al. "Lithium alloy formation at bismuth thin layer electrode", 2002, Journal of Power Sources, vol. 104, pp. 90-96; retrieved from https://www.sciencedirect.com/science/article/pii/S037877530100876X (Year: 2002).*

International Search Report of PCT application No. PCT/JP2021/038855 dated Nov. 30, 2021.

The EPC Office Action dated May 9, 2025 for the related European Patent Application No. 21923045.5.

* cited by examiner

BATTERY

BACKGROUND

1. Technical Field

The present disclosure relates to a battery.

2. Description of the Related Art

Lithium secondary batteries have been a subject of active research and development in recent years, and their battery characteristics, such as charge-discharge voltage, charge-discharge cycle life, and storage properties, are strongly dependent on electrodes used therein. Thus, battery characteristics have been improved by improving electrode active materials.

For example, lithium secondary batteries that use aluminum, silicon, or tin that electrochemically alloys with lithium during charging have been proposed from early days. Japanese Patent No. 4898737 discloses a lithium secondary battery equipped with a negative electrode made of an alloy containing silicon, tin, and a transition metal, a positive electrode, and an electrolyte. Japanese Patent No. 3733065 discloses a lithium secondary battery equipped with a negative electrode that uses, as an active material, a silicon thin film formed on a current collector, a positive electrode, and an electrolyte.

SUMMARY

One non-limiting and exemplary embodiment provides a battery having good cycle characteristics.

In one general aspect, the techniques disclosed here feature A battery of the present disclosure includes a first electrode; a second electrode; and a solid electrolyte layer disposed between the first electrode and the second electrode, in which the first electrode includes a current collector and an active material layer disposed between the current collector and the solid electrolyte layer, and the active material layer contains Bi as a main component of an active material.

The present disclosure can provide a battery having good cycle characteristics.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Figure 1:
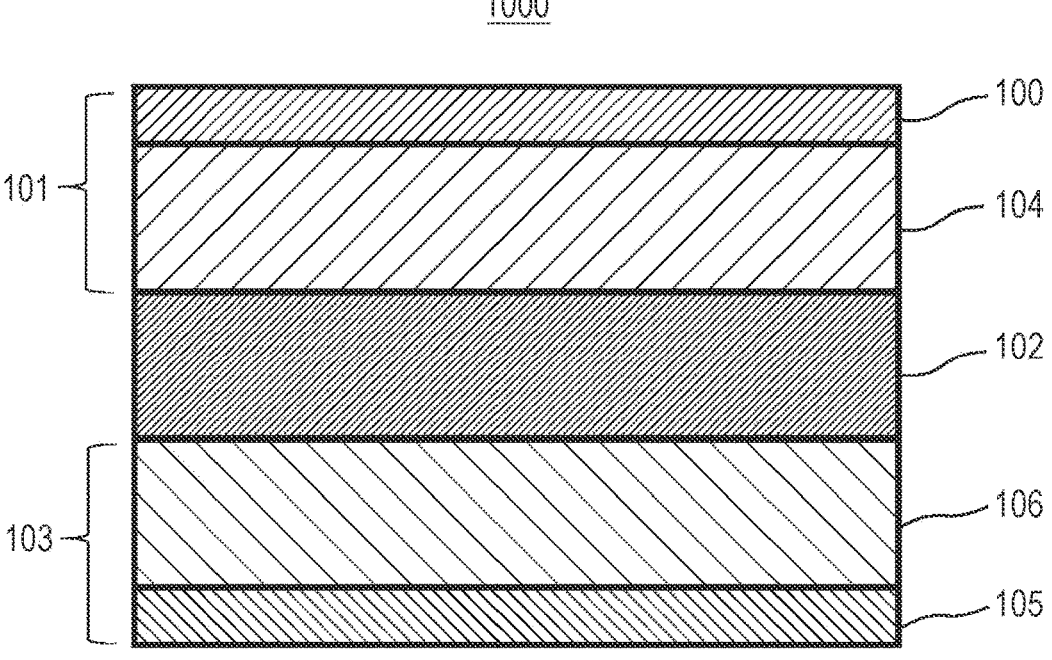
FIG. 1 is a schematic cross-sectional view of a structural example of a battery 1000 according to an embodiment of the present disclosure.

Underlying Knowledge Forming Basis of the Present Disclosure

As described in "Background Art" section, battery characteristics of lithium secondary batteries have been improved by improving electrode active materials.

When lithium metal is used as a negative electrode active material, a lithium secondary battery that has high energy densities per weight and per volume is obtained. However, when a lithium secondary battery having this structure is being charged, lithium dendrites are formed by deposition. Since some of the lithium metal deposits react with the electrolyte, issues of low charge/discharge efficiency and deteriorated cycle characteristics have occurred.

To address this, a proposal to use carbon, in particular, graphite, as a negative electrode has been made. In a negative electrode containing carbon, charging and discharging are realized by lithium intercalation into and deintercalation from carbon. When a negative electrode has such a structure, the charge-discharge mechanism does not cause deposition of lithium metal dendrites. In addition, a lithium secondary battery that has a negative electrode having such a structure has excellent reversibility due to topotactic reactions and has nearly 100% charge/discharge efficiency. Due to these features, lithium secondary batteries having negative electrodes containing carbon, in particular, graphite, have been put to practical use. However, the theoretical capacity density of graphite is 372 mAh/g, which is about one tenth of the theoretical capacity density of lithium metal, 3884 mAh/g. Thus, the active material capacity density of a negative electrode containing graphite is low. Furthermore, since the actual capacity density of graphite is nearly as high as the theoretical capacity density, increasing the capacity of the negative electrode containing graphite has reached a limit.

To address this, lithium secondary batteries that use aluminum, silicon, tin, or the like that electrochemically alloys with lithium during charging have been proposed from early days. The capacity density of a metal that alloys with lithium is far larger than the capacity density of graphite. In particular, the theoretical capacity density of silicon is high. Thus, an electrode containing a material, such as aluminum, silicon, or tin, that alloys with lithium has a good prospect as a negative electrode for a high-capacity battery, and various types of secondary batteries that use such negative electrodes have been proposed (Japanese Patent No. 4898737).

However, a negative electrode that contains the aforementioned metal that alloys with lithium expands upon lithium intercalation and contracts upon lithium deintercalation. Repeating such expansion and contraction during charging and discharging breaks the alloy serving as the electrode active material into fine particles due to charging and discharging and deteriorates the current collecting properties of the negative electrode; thus, sufficient cycle characteristics have not been obtained. The following attempts have been made to address these issues. For example, in one attempt, silicon is sputter-deposited or vapor-deposited on a roughened surface of a current collector, or tin is deposited by electroplating (Japanese Patent No. 3733065). According to this attempt, the active material, in other words, a metal that alloys with lithium, forms a thin film and closely adheres to the current collector, and thus current collecting properties are rarely degraded despite repeated expansion and contraction of the negative electrode caused by lithium intercalation and deintercalation.

However, when an active material is formed by sputtering or vapor deposition as described above, the production cost is high and the process is unpractical. It is practical to form an active material by less costly electroplating; however, silicon is difficult to electroplate. Moreover, tin, which is easy to electroplate, has issues of poor discharge flatness and the difficulty in using as an electrode of a battery.

Another metal that alloys with lithium is bismuth (Bi). Bi forms compounds, LiBi and $Li_3Bi$, with lithium (Li). The potential of LiBi is not much different from the potential of $Li_3Bi$. In contrast, tin, which has poor discharge flatness, forms several compounds with lithium, and the potential of the compounds significantly differ from one another. In other words, unlike tin, Bi does not have properties of forming multiple compounds, which have significantly different potentials from one another, with lithium. Thus, an electrode that contains Bi as the active material has excellent discharge flatness due to the flat potential. Thus, an electrode that contains Bi as the active material is considered to be suitable as an electrode of a battery.

However, when a battery equipped with an electrode that includes an active material layer containing Bi as the main component of the active material is repeatedly charged and discharged, the capacity sometimes decreases to one third of the initial capacity or less after about 20 cycles.

The present inventors have conducted further investigations and found that, when the active material layer that contains Bi as the main component of the active material is repeatedly expanded and contracted by the repeated charging and discharging, the nonaqueous electrolyte solution enters voids formed in the active material layer, destroys the structure of the active material layer, and thereby decreases the electron-conducting paths inside the active material layer.

The present inventors have conducted studies to address the aforementioned issues and have arrived at the battery of the present disclosure indicated below.

Summary of One Aspect of the Present Disclosure

A battery according to a first aspect of the present disclosure includes:
a first electrode;
a second electrode; and
a solid electrolyte layer disposed between the first electrode and the second electrode, wherein the first electrode includes a current collector and an active material layer disposed between the current collector and the solid electrolyte layer, and the active material layer contains Bi as a main component of an active material.

According to the battery of the first aspect, the electrolyte layer is a solid electrolyte layer. Thus, the electrolyte is prevented from entering the active material layer even when the active material layer containing Bi as the main component of the active material is repeatedly expanded and contracted by charging and discharging, and thus the decrease in the electron-conducting paths in the active material layer can be reduced. Thus, the battery of the first aspect has good cycle characteristics.

According to a second aspect of the present disclosure, for example, the solid electrolyte layer of the battery of the first aspect may contain a halide solid electrolyte, and the halide solid electrolyte does not contain sulfur.

The battery of the second aspect has good cycle characteristics.

According to a third aspect of the present disclosure, for example, the halide solid electrolyte of the battery of the second aspect may be a compound composed of Li, M1, and X1. M1 is at least one selected from the group consisting of metal elements other than Li and metalloids, and X1 is at least one selected from the group consisting of F, Cl, Br, and I.

The battery of the third aspect has a higher capacity and good cycle characteristics.

According to a fourth aspect of the present disclosure, for example, in the battery of the third aspect, M1 may contain Y and X1 may contain Cl and Br.

The battery of the fourth aspect has a higher capacity and good cycle characteristics.

According to a fifth aspect of the present disclosure, for example, the solid electrolyte layer of the battery of the first aspect may contain a sulfide solid electrolyte.

The battery of the fifth aspect has good cycle characteristics.

According to a sixth aspect of the present disclosure, for example, the solid electrolyte layer of the battery of the fifth aspect may consist essentially of a sulfide solid electrolyte.

The battery of the sixth aspect has a higher capacity and good cycle characteristics.

According to a seventh aspect of the present disclosure, for example, the sulfide solid electrolyte in the battery according to the fifth or sixth aspect may have an argyrodite crystal structure.

The battery of the seventh aspect has a higher capacity and good cycle characteristics.

According to an eighth aspect of the present disclosure, for example, the sulfide solid electrolyte in the battery according to any one of the fifth to seventh aspects may be represented by a compositional formula $Li_{7-a}AS_{6-a}X2_a$. Here, A is at least one selected from the group consisting of P and As, X2 is at least one selected from the group consisting of Cl, Br, and I, and a satisfies $0 \leq a \leq 1$.

The battery of the eighth aspect has a higher capacity and good cycle characteristics.

According to a ninth aspect of the present disclosure, for example, the sulfide solid electrolyte in the battery according to any one of the fifth to eighth aspects may be represented by a compositional formula $Li_6PS_5Cl$.

The battery of the ninth aspect has a higher capacity and good cycle characteristics.

According to a tenth aspect of the present disclosure, for example, the density of the active material in the battery according to any one of the first to ninth eighth aspects may be greater than or equal to 6.0 g/cm³ and less than or equal to 9.8 g/cm³. Here, when the first electrode is a negative electrode, the density of the active material refers to the density of the active material in the battery in a fully discharged state, and when the first electrode is a positive electrode, the density of the active material refers to the density of the active material in the battery in a fully charged state.

The battery of the tenth aspect has a high capacity and good cycle characteristics.

According to an eleventh aspect of the present disclosure, for example, the density of the active material in the battery of the tenth aspect may be greater than or equal to 7.5 g/cm³ and less than or equal to 9.8 g/cm³.

The battery of the eleventh aspect has a higher capacity and good cycle characteristics.

According to a twelfth aspect of the present disclosure, for example, the battery of any one of first to eleventh aspects may have I(2)/I(1) greater than or equal to 0.29, where I(2)/I(1) is a ratio of a height intensity I(2) of a maximum peak present in a diffraction angle 2θ range of from 370 to 390 to a height intensity I(1) of a maximum peak present in a diffraction angle 2θ range of from 260 to 280 in an X-ray diffraction pattern of the active material layer obtained by surface X-ray diffraction measurement using Cu-Kα radiation.

The battery of the twelfth aspect has a higher capacity and good cycle characteristics.

According to a thirteenth aspect of the present disclosure, for example, I(2)/I(1) of the battery of the twelfth aspect may be less than or equal to 0.57.

The battery of the thirteenth aspect has a higher capacity and good cycle characteristics.

According to a fourteenth aspect of the present disclosure, for example, the active material layer of the battery according to any one of the first to thirteenth aspects may contain elemental Bi.

The battery of the fourteenth aspect has a higher capacity and good cycle characteristics.

According to a fifteenth aspect of the present disclosure, for example, the active material layer of the battery according to any one of the first to fourteenth aspects may contain at least one selected from the group consisting of LiBi and $Li_3Bi$.

The battery of the fifteenth aspect has a higher capacity and good cycle characteristics.

According to a sixteenth aspect of the present disclosure, for example, the active material layer of the battery according to any one of the first to fifteenth aspects may contain only elemental Bi as an active material.

The battery of the sixteenth aspect has a higher capacity and good cycle characteristics.

According to a seventeenth aspect of the present disclosure, for example, the active material layer of the battery according to any one of the first to sixteenth aspects may contain no electrolyte.

According to the seventeenth aspect, a battery having a higher capacity per volume and good cycle characteristics is obtained.

According to an eighteenth aspect of the present disclosure, for example, the current collector of the battery according to any one of the first to seventeenth aspects may contain Cu.

The battery of the eighteenth aspect has a higher capacity and good cycle characteristics.

According to a nineteenth aspect of the present disclosure, for example, the active material layer of the battery according to any one of the first to eighteenth aspects may be a plating layer.

According to the nineteenth aspect, a battery having a higher capacity per volume and good cycle characteristics is obtained.

According to a twentieth aspect of the present disclosure, for example, the first electrode and the second electrode in the battery according to any one of the first to nineteenth aspects may be a negative electrode and a positive electrode, respectively.

The battery of the twentieth aspect has a higher capacity and good cycle characteristics.

According to a twenty-first aspect of the present disclosure, for example, the second electrode of the battery according to any one of the first to twentieth aspects may contain a compound represented by compositional formula (1) below:

$$LiNi_xMe_{1-x}O_2 \tag{1}$$

where x satisfies $0 < x \le 1$, and Me is at least one element selected from the group consisting of Mn, Co, and Al.

According to the battery of the twenty-first aspect, the production cost of the second electrode can be decreased, the average discharge voltage can be increased, and the battery has a higher capacity and good cycle characteristics.

According to a twenty-second aspect of the present disclosure, for example, x of the battery of the twenty-first aspect may satisfy $0.5 < x \le 1$.

The battery of the twenty-second aspect has a higher capacity and good cycle characteristics.

Embodiments of the Present Disclosure

Hereinafter, the embodiments of the present disclosure are described with reference to the drawings. The descriptions below all indicate comprehensive or specific examples. The numerical values, compositions, shapes, film thickness, electrical characteristics, secondary battery structure, etc., indicated below are merely examples, and do not limit the present disclosure.

FIG. 1 is a schematic cross-sectional view of a structural example of a battery 1000 according to an embodiment of the present disclosure.

The battery 1000 has a first electrode 101, a second electrode 103, and a solid electrolyte layer 102 disposed between the first electrode 101 and the second electrode 103. The first electrode 101 includes a current collector 100 and an active material layer 104 disposed between the current collector 100 and the solid electrolyte layer 102. The active material layer 104 contains Bi as the main component of the active material.

In the battery 1000, the electrolyte layer is the solid electrolyte layer 102. Thus, the electrolyte is prevented from entering the active material layer 104 even when the active material layer 104 containing Bi as the main component of the active material is repeatedly expanded and contracted by charging and discharging. Thus, the decrease in the electron-conducting paths in the active material layer 104 caused by the repeated charging and discharging is reduced. Thus, the battery 1000 has good cycle characteristics.

The battery 1000 is, for example, a lithium secondary battery. Hereinafter, an example in which the metal ions that are intercalated into and deintercalated from the active material layer 104 in the first electrode 101 and the second electrode 103 during charging and discharging of the battery 1000 are lithium ions is described.

The phrase "the active material layer 104 contains Bi as the main component of the active material" means that, "in the active material layer 104, the component contained in the highest molar ratio as the active material is Bi".

According to the aforementioned features, good charge-discharge cycle characteristics are obtained.

The density of the active material contained in the active material layer 104 may be greater than or equal to 6.0 $g/cm^3$ and less than or equal to 9.8 $g/cm^3$.

According to the aforementioned features, better charge-discharge cycle characteristics are obtained.

Here, in this description, the definition of the density of the active material contained in the active material layer 104 of the first electrode 101 is as follows: when the first electrode 101 is a negative electrode, the density refers to the density of the active material in the battery 1000 in a fully discharged state, and when the first electrode 101 is a positive electrode, the density refers to the density of the active material contained in the active material layer 104 in the battery 1000 in a fully charged state. In other words, the density of the active material contained in the active material layer 104 of the first electrode 101 specified by the present description is the density of the active material contained in the active material layer 104 when lithium ions are deintercalated from the active material layer 104 due to full charging or full discharging. Here, the "fully charged state" of the battery according to the present disclosure refers to a state in which charging is conducted at a particular current (for example, 0.05 C relative to the theoretical capacity) to a particular voltage (for example, a negative electrode potential of 0 V on the lithium reference electrode basis). Here, the "fully discharged state" of the battery according to the present disclosure refers to a state in which discharging is conducted at a particular current (for example, 0.05 C relative to the theoretical capacity) to a particular voltage (for example, a negative electrode potential of 2 V on the lithium reference electrode basis). The density of the active material contained in the active material layer 104 can be determined by, for example, taking out the active material from the active material layer 104 and calculating the density of the taken-out active material by, for example, the Archimedes's principle. For example, when the active material layer 104 is constituted by a thin film consisting essentially of an active material, at least one portion of the thin film is taken out as a sample, and the density of the sample is calculated by, for example, the Archimedes's principle to obtain the density of the active material. Here, the thin film consisting essentially of an active material refers to a thin film that has an active material content greater than or equal to 90 mass %.

The active material layer 104 that contains Bi as the main component of the active material and has an active material density greater than or equal to 6.0 $g/cm^3$ and less than or equal to 9.8 $g/cm^3$ can be constituted by Bi formed into a thin film (hereinafter referred to as a "Bi thin film"), for example. The active material layer 104 constituted by a highly dense Bi thin film that satisfies the aforementioned density range can exhibit high adhesion to the current collector 100 when brought into contact with the current collector 100. According to this feature, the active material, in other words, Bi which is a metal that alloys with lithium, has a thin film form and closely adheres to the current collector 100, and thus, electron-conducting paths can be maintained despite repeated expansion and contraction of Bi caused by lithium intercalation and deintercalation. Thus, when the density of the active material contained in the active material layer 104 of the first electrode 101 according to the present disclosure is greater than or equal to 6.0 $g/cm^3$ and less than or equal to 9.8 $g/cm^3$, degradation of the current collecting properties rarely occurs despite repeated expansion and contraction of the active material layer 104 caused by Li intercalation an deintercalation. Thus, when the density of the active material contained in the active material layer 104 of the first electrode 101 is greater than or equal to 6.0 $g/cm^3$ and less than or equal to 9.8 $g/cm^3$, the battery 1000 can exhibit good cycle characteristics.

Furthermore, the active material layer 104 constituted by a Bi thin film that satisfies the aforementioned density range can secure sufficient electron-conducting paths since the active material density is high. Thus, the first electrode 101 that includes the active material layer 104 constituted by a Bi thin film can achieve a higher capacity compared to the electrode in which the active material layer is made of a Bi powder. Thus, when the density of the active material contained in the active material layer 104 of the first electrode 101 is greater than or equal to 6.0 $g/cm^3$ and less than or equal to 9.8 $g/cm^3$, the battery 1000 of the present disclosure can achieve a higher capacity as well as good cycle characteristics.

The density of the active material contained in the active material layer 104 may be greater than or equal to 6.5 $g/cm^3$ and less than or equal to 9.8 $g/cm^3$ or may be greater than or equal to 7.0 $g/cm^3$ and less than or equal to 9.8 $g/cm^3$. When the first electrode 101 includes the active material layer 104 having such a high active material density, the battery 1000 can exhibit better cycle characteristics and a higher capacity.

The density of the active material contained in the active material layer 104 may be greater than or equal to 7.5 $g/cm^3$ and less than or equal to 9.8 $g/cm^3$. In particular, the first electrode 101 that includes an active material layer 104 that has a high active material density greater than or equal to 7.5 $g/cm^3$ can further improve the cycle characteristics and the capacity of the battery 1000.

In an X-ray diffraction pattern of the active material layer 104 obtained by surface X-ray diffraction measurement using Cu-K$\alpha$ radiation, I(2)/I(1) may be greater than or equal to 0.29, where I(2)/I(1) is a ratio of a height intensity I(2) of a maximum peak present in a diffraction angle 2θ range of from 370 to 390 to a height intensity I(1) of a maximum peak present in a diffraction angle 2θ range of from 260 to 28°.

Here, in an X-ray diffraction pattern, the maximum peak present in the diffraction angle 2θ range of from 260 to 280 corresponds to the peak of the (1, 0, −1, 2) plane of elemental Bi. Furthermore, in an X-ray diffraction pattern, the maximum peak present in the diffraction angle 2θ range of from 370 to 390 corresponds to the peak of the (1, 0, −1, 4) plane of elemental Bi. The feature that the peak intensity ratio I(2)/I(1) is greater than or equal to 0.29 indicates that, in a surface of the active material layer 104, the ratio of the (1, 0, −1, 4) plane to the (1, 0, −1, 2) plane of elemental Bi, which has a crystal structure of the trigonal R-3m space group, is high. In other words, in a surface of the active material layer 104, the orientation of the (1, 0, −1, 4) is stronger. The active material layer 104 that has a surface that has such an orientation in the crystal structure of elemental Bi can exhibit high adhesion to the current collector 100. Thus, due to this surface orientation of the active material layer 104, degradation of the current collecting properties rarely occurs despite repeated expansion and contraction of the active material layer 104 caused by charging and discharging. Thus, the battery 1000 of the present disclosure can have better cycle characteristics and a higher capacity.

The peak intensity ratio I(2)/I(1) may be less than or equal to 0.57.

According to the aforementioned features, better charge-discharge cycle characteristics are obtained.

The X-ray diffraction pattern of the active material layer 104 can be acquired by θ-2θ X-ray diffractometry with Cu-Kα radiation having wavelengths of 1.5405 Å and 1.5444 Å, in other words, 0.15405 nm and 0.15444 nm.

The diffraction angle of a peak in an X-ray diffraction pattern is defined as an angle that indicates the maximum intensity of a peak having an SN ratio (that is, the ratio of the signal S to the background noise N) greater than or equal to 1.3 and a half width less than or equal to 10°. The half width refers to the width indicated by the difference between two diffraction angles at which the intensity of the X-ray diffraction peak is one half of the maximum intensity $I_{MAX}$ of the peak.

The active material layer 104 constituted by a Bi thin film that contains Bi as the main component of the active material and satisfies the aforementioned density range and surface orientation can be produced by, for example, electroplating. A method for producing a first electrode 101 by producing the active material layer 104 by electroplating is, for example, as follows.

First, a substrate for electroplating is prepared. In the first electrode 101, for example, the current collector 100 serves as a substrate. For example, a copper foil is prepared as the current collector 100. After the copper foil is preliminarily degreased with an organic solvent, one surface of the copper foil is masked, and the copper foil is immersed in an acidic solvent to perform degreasing and to activate the copper foil surface. The activated copper foil is connected to a power supply so that current can be applied. The copper foil connected to the power supply is immersed in an bismuth plating bath. For example, an organic acid bath containing $Bi^{3+}$ ions and an organic acid is used as the bismuth plating bath. Next, electrical current is applied to the copper foil while the current density and application time are controlled so as to electroplate the un-masked surface of the copper foil with Bi. After electroplating, the copper foil is recovered from the plating bath, the mask is removed, and the copper foil is washed with pure water and dried. As a result of this process, a first electrode 101 that includes an active material layer 104 prepared by electroplating with Bi is obtained. Here, the bismuth plating bath used in preparing the active material layer 104 is not particularly limited, and can be appropriately selected from known bismuth plating baths that can deposit elemental Bi thin films. For the bismuth plating bath, an organic sulfonic acid bath, a gluconic acid and ethylenediaminetetraacetic acid (EDTA) bath, or a citric acid and EDTA bath can be used as the organic acid bath. Furthermore, for example, a sulfuric acid bath can be used as the bismuth plating bath. Furthermore, additives may be added to the bismuth plating bath.

The relationship between the thickness of the active material layer prepared by electroplating with Bi and the density of the active material will now be discussed. In the description below, the active material layer 104 prepared by electroplating with Bi may be referred to as an "active material layer made of a Bi plating layer".

Figure 2:
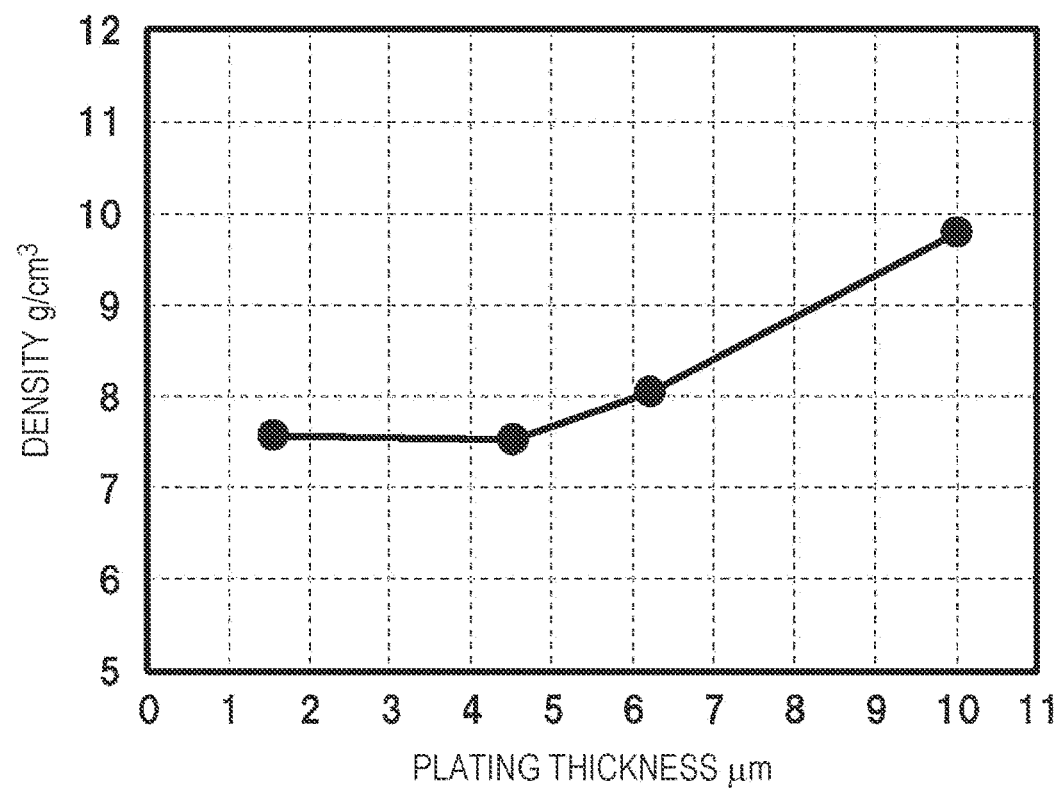
FIG. 2 is a graph indicating the relationship between the thickness of an active material layer made of a Bi plating layer and the density of an active material.

FIG. 2 is a graph indicating the relationship between the thickness of the active material layer made of a Bi plating layer and the density of the active material. Here, the density of the active material density is determined by determining the density of the active material layer made of a Bi plating layer. A sample of the active material layer made of a Bi plating layer was prepared by the same method as in Example 1 described below. However, the length of time the electrical current is applied to the copper foil serving as the plating substrate was adjusted so as to prepare four samples of the active material layer targeted to have a thickness of 1 μm, 3 μm, 5 μm, and 10 μm, respectively. The relationship between the thickness of the active material layer and the density of the active material was determined from the mass, area, and thickness of the active material layer. Here, the thickness of the obtained Bi plating layer was measured with an X-ray fluorescence analyzer (SEA6000VX produced by Seiko Instruments Inc.). The thicknesses of the active material layers of the four samples were, respectively, 1.5 μm, 4.5 μm, 6.2 μm, and 10 μm. As shown by the graph in FIG. 2, when the active material layer is a Bi plating layer, the density of the active material ranges from 7.5 g/cm$^3$ to 9.8 g/cm$^3$.

Structural analysis of the surface of the active material layer made of a Bi plating layer was also carried out by surface X-ray diffraction measurement. The samples of the active material layers made of Bi plating layers used in the surface X-ray diffraction measurement were prepared by the same method as the samples used to confirm the relationship between the thickness of the active material layer and the density of the active material. For comparison, X-ray diffraction measurement was also carried out on a Bi powder.

Figure 3:
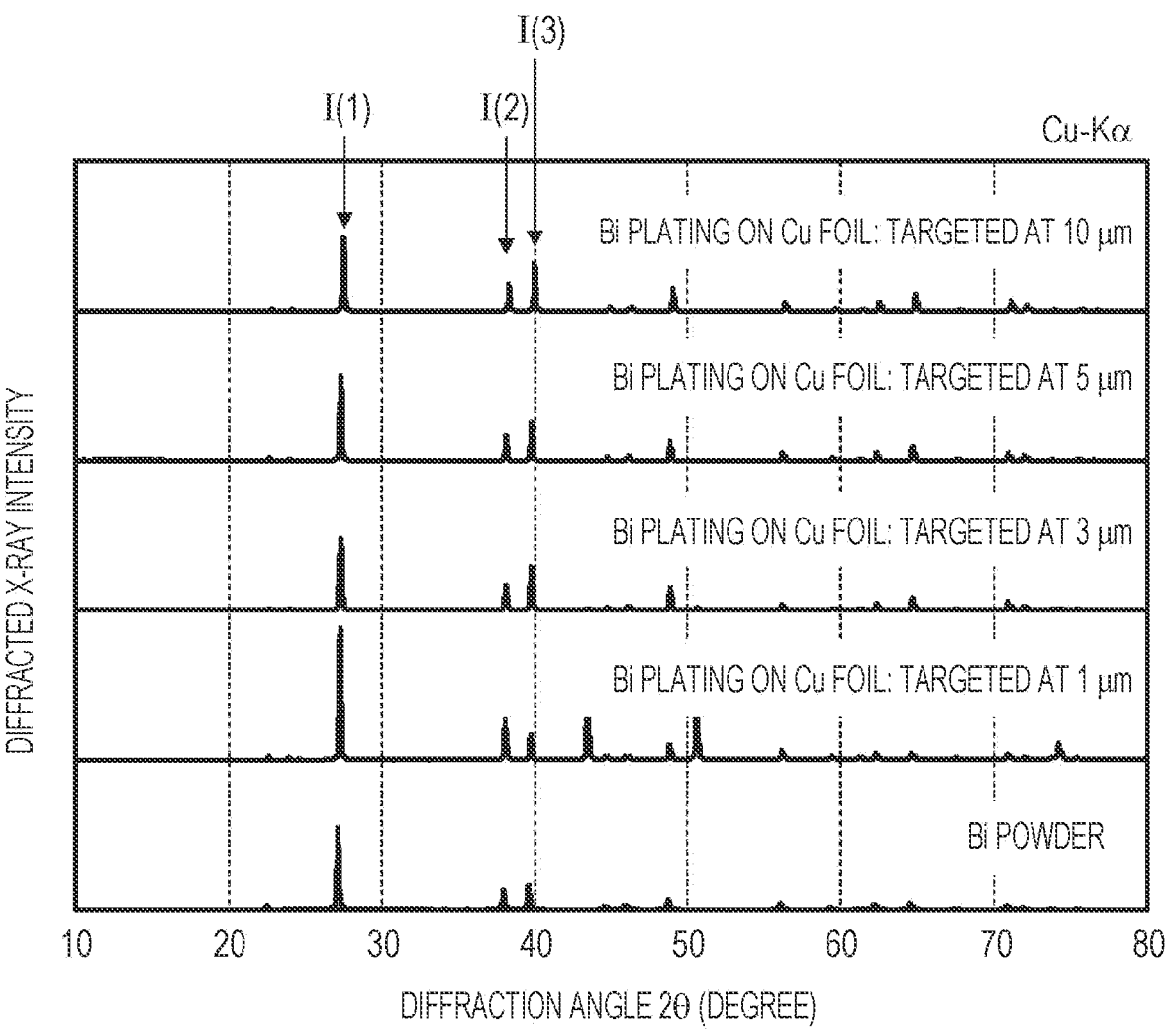
FIG. 3 is a graph indicating one example of the X-ray diffraction patterns of active material layers made of Bi plating layers prepared on copper foils, and a Bi powder.

FIG. 3 is a graph indicating one example of the X-ray diffraction patterns of the active material layers made of Bi plating layers prepared on copper foils, and the Bi powder. The X-ray diffraction pattern was acquired from the surface of the Bi plating layer, that is, in the thickness direction of the active material layer 104, by the θ-2θ method with Cu-Kα radiation having wavelengths of 1.5405 Å and 1.5444 Å as X-rays by using an X-ray diffractometer (MiNi Flex produced by RIGAKU Corporation)

Table indicates calculation results of the intensity ratio I(2)/I(1) of the height intensity I(2) of the maximum peak present in the diffraction angle 2θ range of from 370 to 390 to the height intensity I(1) of the maximum peak present in the diffraction angle 2θ range of from 26° to 28° in X-ray diffraction patterns of the Bi plating layers and the Bi powder obtained by surface X-ray diffraction measurement using Cu-Kα radiation. Table indicates the results of measurement conducted on the Bi plating layers having different thicknesses and the results of measurement conducted three times on the Bi powder.

TABLE

| State | | Peak intensity | | Peak intensity ratio |
|---|---|---|---|---|
| | | I(1) | I(2) | I(2)/I(1) |
| | Target thickness t μm | | | |
| Plating | 10 | 28965 | 10403 | 0.36 |
| | 5 | 34320 | 10025 | 0.29 |
| | 5 | 9224 | 5289 | 0.57 |

TABLE-continued

| State | | Peak intensity | | Peak intensity ratio |
|---|---|---|---|---|
| | | I(1) | I(2) | I(2)/I(1) |
| | 3 | 28906 | 10121 | 0.35 |
| | 1 | 49879 | 20071 | 0.40 |
| | 1 | 52667 | 16010 | 0.30 |
| | N | | | |
| Powder | 1 | 30787 | 4922 | 0.16 |
| | 2 | 34213 | 9139 | 0.27 |
| | 3 | 30787 | 4922 | 0.16 |

Table shows that the ratio I(2)/I(1) of the active material layer 104 prepared by electroplating with Bi is greater than or equal to 0.29. This shows that, in the surface of the active material layer 104 prepared by electroplating with Bi, the ratio of the (1, 0, −1, 4) plane to the (1, 0, −1, 2) plane of elemental Bi, which has a crystal structure of the trigonal R-3m space group, is high. In other words, in a surface of the active material layer 104, the orientation of the (1, 0, −1, 4) plane is stronger. In addition, in the X-ray diffraction patterns shown in FIG. 3, when the Bi plating layers and the Bi powder are compared, the Bi plating layers having a thickness greater than or equal to 3 μm exhibit high peak intensities I(3) near a diffraction angle 2θ=40°. It has thus been found that the Bi plating layer orients in such a way that the (2, −1, −1, 0) plane of elemental Bi having a crystal structure of the trigonal R-3m space group forms the surface. It is considered that, for the Bi plating layers having a thickness of less than 3 μm, the difference in the X-ray diffraction pattern from the Bi powder caused by orientation is not sufficiently confirmed partly due to the influence of the surface roughness, etc., of the copper foil used as the substrate.

In the description below, the features of the battery 1000 of the present embodiment are described in more detail by using, as one example, the case in which the first electrode 101 is a negative electrode and the second electrode 103 is a positive electrode.

[First Electrode]

As mentioned above, the first electrode 101 includes the current collector 100 and the active material layer 104. The features of the active material layer 104 are as described above. The first electrode 101 functions as a negative electrode. Thus, the active material layer 104 contains a negative electrode active material that has properties of intercalating and deintercalating lithium ions. Bi contained in the active material layer 104 functions as a negative electrode active material. The active material layer 104 contains, for example, elemental Bi.

Bi is an active material 0.8 V with respect to lithium, and intercalates and deintercalates lithium ions. Bi is a metal that alloys with lithium. During charging, Bi intercalates lithium by forming an alloy with lithium. In other words, in the first electrode 101, a lithium bismuth alloy is generated during charging of the battery 1000. The lithium bismuth alloy generated contains, for example, at least one selected from the group consisting of LiBi and Li₃Bi. In other words, during charging of the battery 1000, the active material layer 104 contains, for example, at least one selected from the group consisting of LiBi and Li₃Bi. During discharging of the battery 1000, the lithium bismuth alloy deintercalates lithium and returns to Bi.

The active material layer 104 may contain elemental Bi as the only active material.

The active material layer 104 does not have to contain an electrolyte. For example, the active material layer 104 may be a layer composed of elemental Bi and/or a lithium bismuth alloy generated during charging.

The active material layer 104 may be disposed to be in direct contact with the surface of the current collector 100.

The active material layer 104 may have a thin film shape.

The active material layer 104 may be a plating layer formed by depositing Bi by plating. The active material layer 104 may be a Bi plating layer disposed to be in direct contact with the surface of the current collector 100.

When the active material layer 104 is a plating layer disposed to be in direct contact with the surface of the current collector 100, the active material layer 104 closely adheres to the current collector 100. As a result, degradation of the current collecting properties of the first electrode 101 caused by repeated expansion and contraction of the active material layer 104 can be reduced. Thus, the battery 1000 exhibits improved cycle characteristics. Furthermore, when the active material layer 104 is a plating layer, the active material Bi is contained at a high density in the active material layer 104, and thus a further increase in capacitance can be realized.

The active material layer 104 may contain materials other than Bi.

The active material layer 104 may further contain a conductive material.

Examples of the conductive material include carbon materials, metals, inorganic compounds, and conductive polymers. Examples of the carbon materials include graphite, acetylene black, carbon black, Ketjen black, carbon whiskers, needle coke, and carbon fibers. Examples of the graphite include natural graphite and artificial graphite. Examples of the natural graphite include vein graphite and flake graphite. Examples of the metals include copper, nickel, aluminum, silver, and gold. Examples of the inorganic compound include tungsten carbide, titanium carbide, tantalum carbide, molybdenum carbide, titanium boride, and titanium nitride. These materials may be used alone or as a mixture of two or more.

The active material layer 104 may further contain a binder.

Examples of the binder include fluororesins, thermoplastic resins, ethylene propylene diene monomer (EPDM) rubber, sulfonated EPDM rubber, and natural butyl rubber (NBR). Examples of the fluororesins include polytetrafluoroethylene (PTFE), polyvinylidene fluoride (PVdF), and fluororubber. Examples of the thermoplastic resins include polypropylene and polyethylene. These materials may be used alone or as a mixture of two or more.

The thickness of the active material layer 104 is not particularly limited and may be, for example, greater than or equal to 1 μm and less than or equal to 100 μm.

The material for the current collector 100 is, for example, an elemental metal or an alloy. More specifically, an elemental metal or an alloy that contains at least one selected from the group consisting of copper, chromium, nickel, titanium, platinum, gold, aluminum, tungsten, iron, and molybdenum may be used. The current collector 100 may be composed of stainless steel.

The current collector 100 may contain copper (Cu).

The current collector 100 may have a plate shape or a foil shape. From the viewpoint of ease of securing high conductivity, the negative electrode current collector may be a metal foil or a copper-containing metal foil. Examples of the copper-containing metal foil include a copper foil and a copper alloy foil. The copper content of the metal foil may be greater than or equal to 50 mass % or greater than or equal to 80 mass %. In particular, the metal foil may be a copper foil that substantially contains only copper as the metal. The thickness of the current collector 100 may be, for example, greater than or equal to 5 μm and less than or equal to 20 μm.

The current collector 100 may be a multilayer film.

[Solid Electrolyte Layer]

The solid electrolyte contained in the solid electrolyte layer 102 may be a halide solid electrolyte, a sulfide solid electrolyte, an oxide solid electrolyte, a polymer solid electrolyte, or a complex hydride solid electrolyte.

The solid electrolyte layer 102 may contain a halide solid electrolyte.

The halide solid electrolyte refers to a solid electrolyte containing a halogen element. The halide solid electrolyte may contain oxygen in addition to the halogen element. The halide solid electrolyte does not contain sulfur (S).

The halide solid electrolyte may be a compound composed of Li, M1, and X1. In other words, the halide solid electrolyte may be, for example, a material represented by compositional formula (2) below:

$$\text{Li}_\alpha \text{M1}_\beta \text{X1}_\gamma \qquad\qquad \text{Formula (2)}$$

Here, $\alpha$, $\beta$, and $\gamma$ are each a value greater than 0, M1 is at least one selected from the group consisting of metal elements other than Li and metalloids, and X1 is at least one selected from the group consisting of F, Cl, Br, and I.

The "metalloids" are B, Si, Ge, As, Sb, and Te.

The "metal elements" are all group 1 to 12 elements other than hydrogen in the periodic table and all group 13 to 16 elements other than B, Si, Ge, As, Sb, Te, C, N, P, O, S, and Se. In other words, these are a group of elements that can form cations in forming an inorganic compound with a halogen compound.

In compositional formula (2), M1 may contain Y and X1 may contain Cl and Br.

Examples of the halide solid electrolyte that can be used include $\text{Li}_3(\text{Ca, Y, Gd})\text{X1}_6$, $\text{Li}_2\text{MgX}_4$, $\text{Li}_2\text{FeX1}_4$, Li(Al, Ga, In)$\text{X1}_4$, $\text{Li}_3(\text{Al, Ga, In})\text{X1}_6$, and LiI. Here, in these solid electrolytes, the element X1 is at least one selected from the group consisting of F, Cl, Br, and I. In the present disclosure, when the element in a formula is indicated as "(Al, Ga, In)", this means at least one element selected from the group of elements in the parentheses. In other words, "(Al, Ga, In)" has the same meaning as the "at least one selected from the group consisting of Al, Ga, and In". The same applies to other elements.

Another example of the halide solid electrolyte is a compound represented by $\text{Li}_a\text{M2}_b\text{Y}_c\text{X1}_6$. Here, a+mb+3c=6 and c>0. M2 is at least one selected from the group consisting of metal elements other than Li and Y and metalloids. Here, m represents the valence of M2. The "metalloids" are B, Si, Ge, As, Sb, and Te. The "metal elements" are all group 1 to 12 elements (excluding hydrogen) in the periodic table and all group 13 to 16 elements (excluding B, Si, Ge, As, Sb, Te, C, N, P, O, S, and Se) in the periodic table.

In order to increase the ion conductivity of the halide solid electrolyte material, M2 may be at least one selected from the group consisting of Mg, Ca, Sr, Ba, Zn, Sc, Al, Ga, Bi, Zr, Hf, Ti, Sn, Ta, and Nb. The halide solid electrolyte may be $\text{Li}_3\text{YCl}_6$, $\text{Li}_3\text{YBr}_6$, or $\text{Li}_3\text{YBr}_p\text{Cl}_{6-p}$. Here, p satisfies 0<p<6.

The aforementioned features can increase the ion conductivity of the solid electrolyte layer 102. As a result, the decrease in energy density of the battery can be reduced.

The solid electrolyte layer 102 may consist essentially of a halide solid electrolyte. In the present description, "essentially" intends to allow inclusion of impurities at a content less than 0.1 mass %. The solid electrolyte layer 102 may consist of a halide solid electrolyte.

The solid electrolyte layer 102 may contain a sulfide solid electrolyte.

The sulfide solid electrolyte refers to a solid electrolyte containing sulfur (S). The sulfide solid electrolyte may contain a halogen element in addition to sulfur.

Examples of the sulfide solid electrolyte that can be used include $\text{Li}_2\text{S}$—$\text{P}_2\text{S}_5$, LizS—$\text{SiS}_2$, $\text{Li}_2\text{S}$—$\text{B}_2\text{S}_3$, $\text{Li}_2\text{S}$—$\text{GeS}_2$, $\text{Li}_{3.25}\text{Ge}_{0.25}\text{P}_{0.75}\text{S}_4$, and $\text{Li}_{10}\text{GeP}_2\text{S}_{12}$.

The sulfide solid electrolyte may have an argyrodite crystal structure.

The sulfide solid electrolyte may be $\text{Li}_{7-a}\text{AS}_{6-a}\text{X2}_a$. Here, A is at least one selected from the group consisting of P and As, X2 is at least one selected from the group consisting of Cl, Br, and I, and a satisfies 0≤a≤1. $\text{Li}_{7-a}\text{AS}_{6-a}\text{X}_a$ is a sulfide solid electrolyte having an argyrodite crystal structure.

The sulfide solid electrolyte may be $\text{Li}_3\text{PS}_5\text{Cl}$. $\text{Li}_3\text{PS}_5\text{Cl}$ is a sulfide solid electrolyte having an argyrodite crystal structure.

The aforementioned features can increase the ion conductivity of the solid electrolyte layer 102. As a result, the decrease in energy density of the battery can be reduced.

The solid electrolyte layer 102 may consist essentially of a sulfide solid electrolyte. The solid electrolyte layer 102 may consist of a sulfide solid electrolyte.

The solid electrolyte layer 102 may contain an oxide solid electrolyte. Examples of the oxide solid electrolyte include NASICON solid electrolytes such as $\text{LiTi}_2(\text{PO4})_3$ and element substitution products thereof, perovskite solid electrolytes based on (LaLi)$\text{TiO}_3$, LISICON solid electrolytes such as $\text{Li}_{14}\text{ZnGe}_4\text{O}_{16}$, $\text{Li}_4\text{SiO}_4$, $\text{LiGeO}_4$, and element substitution products thereof, garnet solid electrolytes such as $\text{Li}_7\text{La}_3\text{Zr}_2\text{O}_{12}$ and element substitution products thereof, $\text{Li}_3\text{PO}_4$ and N substitution products thereof, and glass or glass ceramic based on a Li—B—O compound such as $\text{LiBO}_2$ or $\text{Li}_3\text{BO}_3$ doped with $\text{Li}_2\text{SO}_4$, $\text{Li}_2\text{CO}_3$, or the like.

The solid electrolyte layer 102 may contain a polymer solid electrolyte. The polymer solid electrolyte can be, for example, a compound between a polymer compound and a lithium salt. The polymer compound may have an ethylene oxide structure. The polymer compound having an ethylene oxide structure can contain a large amount of lithium salts. Thus, the ion conductivity can be further increased. Examples of the lithium salt that can be used include $\text{LiPF}_6$, $\text{LiBF}_4$, $\text{LiSbF}_6$, $\text{LiAsF}_6$, $\text{LiSO}_3\text{CF}_3$, $\text{LiN}(\text{SO}_2\text{CF}_3)_2$, $\text{LiN}(\text{SO}_2\text{C}_2\text{F}_5)_2$, $\text{LiN}(\text{SO}_2\text{CF}_3)(\text{SO}_2\text{C}_4\text{F}_9)$, and $\text{LiC}(\text{SO}_2\text{CF}_3)_3$. One lithium salt selected from among the aforementioned lithium salts can be used alone. Alternatively, a mixture of two or more lithium salts selected from among the aforementioned lithium salts can be used.

The solid electrolyte layer 102 may contain a complex hydride solid electrolyte. Examples of the complex hydride solid electrolyte that can be used include $\text{LiBH}_4$—LiI and $\text{LiBH}_4$—$\text{P}_2\text{S}_5$.

The solid electrolyte layer 102 may further contain a binder. The same materials as the materials that can be used in the active material layer 104 can be used as the binder.

The solid electrolyte layer 102 may have a thickness greater than or equal to 1 m and less than or equal to 500 μm. When the solid electrolyte layer 102 has a thickness greater than or equal to 1 μm, short circuiting between the first electrode 101 and the second electrode 103 rarely occurs. When the solid electrolyte layer 102 has a thickness less than or equal to 500 μm, the battery can operate at high output.

The shape of the solid electrolyte is not particularly limited. When the solid electrolyte is a powder material, the shape thereof may be a needle shape, a spherical shape, an oval shape, or the like. For example, the solid electrolyte may have a particle shape.

When the solid electrolyte has a particle shape (for example, a spherical shape), the median diameter of the solid electrolyte may be less than or equal to 100 μm or less than or equal to 10 μm.

In the present disclosure, the "median diameter" refers to the particle diameter at which the accumulated volume in a volume-based particle size distribution is 50%. The volume-based particle size distribution is, for example, measured by a laser diffraction measuring instrument or an image analyzer.

The solid electrolyte contained in the solid electrolyte layer 102 can be prepared by the following method.

Raw material powders are prepared so that a desired composition is achieved. Examples of the raw material powders include an oxide, a hydroxide, a halide, and an acid halide.

In one example where the solid electrolyte is a halide solid electrolyte and the desired composition is $Li_3YBr_4Cl_2$, LiBr, YCl, and YBr are mixed at a molar ratio of about 3:0.66: 0.33. In order to cancel out compositional changes that could happen in the synthetic process, the raw materials powder may be mixed at a preliminarily adjusted molar ratio.

The raw material powders are mechanochemically reacted with one another in a mixer such as a planetary ball mill (in other words, by a mechanochemical milling method) so as to obtain a reaction product. The reaction product may be heat-treated in vacuum or in an inert atmosphere. Alternatively, a mixture of raw material powders may be heat-treated in vacuum or in an inert atmosphere to obtain a reaction product. The heat treatment is desirably performed at a temperature higher than or equal to 100° C. and lower than or equal to 300° C. for 1 hour or longer. In order to suppress compositional changes during heat treatment, the raw material powders are desirably heat-treated in a sealed container such as a quartz tube.

A solid electrolyte of the solid electrolyte layer 102 is obtained by the method described above.

When the solid electrolyte is a sulfide solid electrolyte, the sulfide solid electrolyte can be prepared by the following method.

Raw material powders are prepared so that a desired composition is achieved.

In one example where the desired composition is $Li_6PS_5Cl$, $Li_2S$, $P_2S_5$, and LiCl are mixed at a molar ratio of about 2.5:0.5:1. In order to cancel out compositional changes that could happen in the synthetic process, the raw materials powder may be mixed at a preliminarily adjusted molar ratio.

The raw material powders are crushed and mixed in a mixer such as a planetary ball mill, a bead mill, or a homogenizer. After dried, the mixture is heat-treated in an inert atmosphere or a hydrogen sulfide gas ($H_2S$) atmosphere at a temperature higher than or equal to 350° C. and lower than or equal to 550° C. The heat treatment is desirably performed for 8 hour or longer, for example. In order to suppress compositional changes during heat treatment, the raw material powders are desirably heat-treated in a sealed container such as a quartz tube. The heat-treated product is disintegrated or crushed into a particular particle size so as to obtain a sulfide solid electrolyte.

[Second Electrode]

The second electrode 103 functions as a positive electrode. The second electrode 103 contains a material that can intercalate and deintercalate metal ions such as lithium ions. This material is, for example, a positive electrode active material.

The second electrode 103 may include a current collector 105 and an active material layer 106. The active material layer 106 contains a positive electrode active material. The active material layer 106 is disposed between the current collector 105 and the solid electrolyte layer 102, for example.

The active material layer 106 may be disposed to be in direct contact with the surface of the current collector 105.

Examples of the positive electrode active material that can be used include lithium-containing transition metal oxides, transition metal fluorides, polyanion materials, fluorinated polyanion materials, transition metal sulfides, transition metal oxysulfides, and transition metal oxynitrides. Examples of the lithium-containing transition metal oxides include $LiNi_{1-x-y}Co_xAl_yO_2$ ((x+y)<1), $LiNi_{1-x-y}Co_xMn_yO_2$ ((x+y)<1), and $LiCoO_2$. In particular, when a lithium-containing transition metal oxide is used as the positive electrode active material, the production cost of the electrode can be reduced, and the average discharge voltage of the battery can be increased. For example, the positive electrode active material may contain $Li(Ni, Co, Mn)O_2$.

The second electrode 103 may contain a compound represented by compositional formula (1) below:

$$LiNi_xMe_{1-x}O_2 \qquad (1)$$

where x satisfies 0<x≤1, and Me is at least one element selected from the group consisting of Mn, Co, and Al. Here, x may satisfy 0.5≤x≤1.

The compound represented by compositional formula (1) above can function as a positive electrode active material, for example.

The examples of the material for the current collector 105 include metal materials.

Examples of the metal materials include copper, stainless steel, iron, and aluminum.

The second electrode 103 may contain a solid electrolyte. The solid electrolytes that are described as examples of the material constituting the solid electrolyte layer 102 may be used as this solid electrolyte.

The positive electrode active material may have a median diameter greater than or equal to 0.1 μm and less than or equal to 100 μm. When the positive electrode active material has a median diameter greater than or equal to 0.1 μm, the positive electrode active material and the solid electrolyte can create a good dispersion state. As a result, the charge-discharge characteristics of the battery are improved. When the positive electrode active material has a median diameter less than or equal to 100 μm, the lithium diffusion speed is improved. As a result, the battery can operate at high output.

The positive electrode active material may have a median diameter greater than that of the solid electrolyte. In this manner, the positive electrode active material and the solid electrolyte can create a good dispersion state.

From the viewpoint of the energy density and output of the battery, in the second electrode 103, the ratio of the volume of the positive electrode active material to the total of the volume of the positive electrode active material and the volume of the solid electrolyte may be greater than or equal to 0.30 and less than or equal to 0.95.

In order to prevent the solid electrolyte from reacting with the positive electrode active material, a coating layer may be formed on the surface of the positive electrode active material. In this manner, the increase in reaction overvoltage of the battery can be reduced. Examples of the coating material contained in the coating layer include sulfide solid electrolytes, oxide solid electrolytes, and halide solid electrolytes.

The thickness of the second electrode 103 may be greater than or equal to 10 m and less than or equal to 500 μm. When the thickness of the second electrode 103 is greater than or equal to 10 μm, a sufficient battery energy density can be secured. When the thickness of the second electrode 103 is less than or equal to 500 μm, the battery can operate at high output.

The second electrode 103 may contain a conductive material to increase electron conductivity.

The second electrode 103 may contain a binder.

The same materials as the materials that can be used in the active material layer 104 can be used as the conductive material and the binder.

For the purpose of facilitating lithium ion exchange and improving the output characteristics of the battery, the second electrode 103 may contain a nonaqueous electrolyte solution, a gel electrolyte, or an ionic liquid.

The nonaqueous electrolyte solution contains a nonaqueous solvent and a lithium salt dissolved in the nonaqueous solvent. Examples of the nonaqueous solvent include cyclic carbonate solvents, linear carbonate solvents, cyclic ether solvents, linear ether solvents, cyclic ester solvents, linear ester solvents, and fluorine solvents. Examples of the cyclic carbonate solvents include ethylene carbonate, propylene carbonate, and butylene carbonate. Examples of the linear carbonate solvents include dimethyl carbonate, ethyl methyl carbonate, and diethyl carbonate. Examples of the cyclic ether solvents include tetrahydrofuran, 1,4-dioxane, and 1,3-dioxolane. Examples of the linear ether solvents include 1,2-dimethoxyethane and 1,2-diethoxyethane. An example of the cyclic ester solvents is γ-butyrolactone. An example of the linear ester solvents is methyl acetate.

Examples of the fluorine solvents include fluoroethylene carbonate, methyl fluoropropionate, fluorobenzene, fluoroethyl methyl carbonate, and fluorodimethylene carbonate. One nonaqueous solvent selected from these may be used alone. Alternatively, a mixture of two or more nonaqueous solvents selected from among these may be used.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from these may be used alone. Alternatively, a mixture of two or more lithium salts selected from among these may be used. The lithium salt concentration is, for example, in the range of from 0.5 mol/L to 2 mol/L.

A polymer material impregnated with a nonaqueous electrolyte solution can be used as the gel electrolyte. Examples of the polymer material include polymers having polyethylene oxide, polyacrylonitrile, polyvinylidene fluoride, polymethyl methacrylate, or ethylene oxide bonds.

Examples of the cations contained in the ionic liquid include: (i) aliphatic linear quaternary salts such as tetraalkylammonium and tetraalkylphosphonium; (ii) aliphatic cyclic ammoniums such as pyrrolidiniums, morpholiniums, imidazoliniums, tetrahydropyrimidiniums, piperaziniums, and piperidiniums; and (iii) nitrogen-containing heterocyclic aromatic cations such as pyridiniums and imidazoliums.

Examples of the anions contained in the ionic acid include $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, and $C(SO_2CF_3)_3^-$.

The ionic liquid may contain a lithium salt.

Although the structure example in which the first electrode 101 is a negative electrode and the second electrode 103 is a positive electrode has been described heretofore, the first electrode 101 may be a positive electrode and the second electrode 103 may be a negative electrode.

When the first electrode 101 is a positive electrode and the second electrode 103 is a negative electrode, the active material layer 104 is a positive electrode active material layer. In other words, Bi contained in the active material layer 104 functions as a positive electrode active material. In such a case, the second electrode 103 serving as a negative electrode is made of, for example, lithium metal.

The battery 1000 includes the first electrode 101, the solid electrolyte layer 102, and the second electrode 103 as the basic features, and is enclosed in a sealed container so that air and moisture would not mix in. Examples of the shape of the battery 1000 include a coin shape, a cylinder shape, a prism shape, a sheet shape, a button shape, a flat shape, and a multilayer shape.

EXAMPLES

In the description below, the details of the present disclosure are disclosed through Examples and Reference examples. Examples described below are merely illustrative, and do not limit the present disclosure.

Example 1

<Preparation of First Electrode>

After a copper foil (10 cm×10 cm, thickness: 12 μm) was preliminarily degreased with an organic solvent as a preliminary treatment, one surface of the copper foil was masked, and the copper foil was immersed in an acidic solvent to perform degreasing and to activate the copper foil surface. To 1.0 mol/L methanesulfonic acid, bismuth methanesulfonate serving as a soluble bismuth salt was added so that the $Bi^{3+}$ ion concentration was 0.18 mol/L so as to prepare a plating bath. The activated copper foil was connected to a power supply so that current could be applied, and then immersed in the plating bath. Next, the un-masked surface of the copper foil was electroplated with Bi by controlling the current density to 2 A/dm² so that the thickness of the plating layer was about 1 μm. After electroplating, the copper foil was recovered from the acidic bath, the mask was removed, and the copper foil was washed with pure water, dried, and punched out into a 2 cm×2 cm piece so as to obtain a first electrode. In other words, the first electrode of Example 1 was constituted by a current collector made of a copper foil and an active material layer made of a Bi plating layer. In the first electrode of Example 1, the density of the active material contained in the active material layer made of the Bi plating layer could be determined from the graph in FIG. 2, and was 7.5 g/cm³. Furthermore, the X-ray diffraction pattern obtained by surface X-ray diffraction measurement on the active material layer made of the Bi plating layer is indicated in FIG. 3, and the peak intensity ratio I(2)/I(1) is indicated in Table. In the active material layer of the battery of Example 1, the peak intensity ratio I(2)/I(1) was greater than or equal to 0.29.

<Preparation of Solid Electrolyte>

In an argon atmosphere having a dew point lower than or equal to −60° C. (hereinafter referred to as a "dry argon atmosphere"), the raw material powders, LiBr, $YCl_3$, and $YBr_3$, were prepared at a molar ratio of LiBr:$YCl_3$:$YBr_3$=3: 2/3:1/3. These raw material powders were crushed and mixed in a mortar into a mixed powder. The obtained mixture of the raw material powders was heat-treated in a dry argon atmosphere in an electric furnace at 500° C. for 3 hours, as a result of which a heat-treated product was obtained. The obtained heat-treated product was crushed with a pestle in a mortar. As a result, a solid electrolyte having a composition represented by $Li_3YBr_4Cl_2$ was obtained.

<Preparation of Test Cells>

In an insulating external cylinder having an inner diameter of 9.4 mm, the solid electrolyte $Li_3YBr_4Cl_2$ (80 mg) was stacked on the Bi-plated surface of the obtained first electrode serving as a working electrode, and then an indium-lithium alloy (molar ratio In:Li=1:1) (200 mg) was stacked as a counter electrode to form a multilayer body. The indium-lithium alloy was prepared by pressing a small piece of a lithium foil onto an indium foil and diffusing lithium into indium. A pressure of 360 MPa was applied to the multilayer body to form a working electrode, a solid electrolyte layer, and a counter electrode. In the multilayer body, the thickness of the first electrode serving as a working electrode was 1.5 μm, the thickness of the solid electrolyte layer was 500 μm, and the thickness of the counter electrode was 15 μm.

Next, current collectors made from stainless steel were attached to the working electrode and the counter electrode, and current collecting leads were attached to the current collectors.

Lastly, the inside of the insulating external cylinder was shut-out from the external atmosphere by using an insulating ferrule to seal the inside of the cylinder.

As a result, a test cell of Example 1 in which the first electrode having an active material layer made of a Bi plating layer served as a working electrode and the lithium-indium alloy served as a counter electrode was obtained. Here, the prepared test cell is a unipolar test cell that uses a working electrode and a counter electrode, and is used to test performance of one of the electrodes in a secondary battery. To be more specific, an electrode to be tested is used as the working electrode, and an active material in an amount sufficient for the reaction at the working electrode is used in the counter electrode. Since the present test cell was used to test the performance of the first electrode serving as a negative electrode, a large excess of a lithium-indium alloy was used as the counter electrode as with the usual practice. The negative electrode performance of which was tested using such a test cell can be used in a secondary battery when used together with a positive electrode that contains the positive electrode active material mentioned in the above-described embodiments, for example, a transition metal oxide containing Li.

<Charge-Discharge Test>

Figure 4:
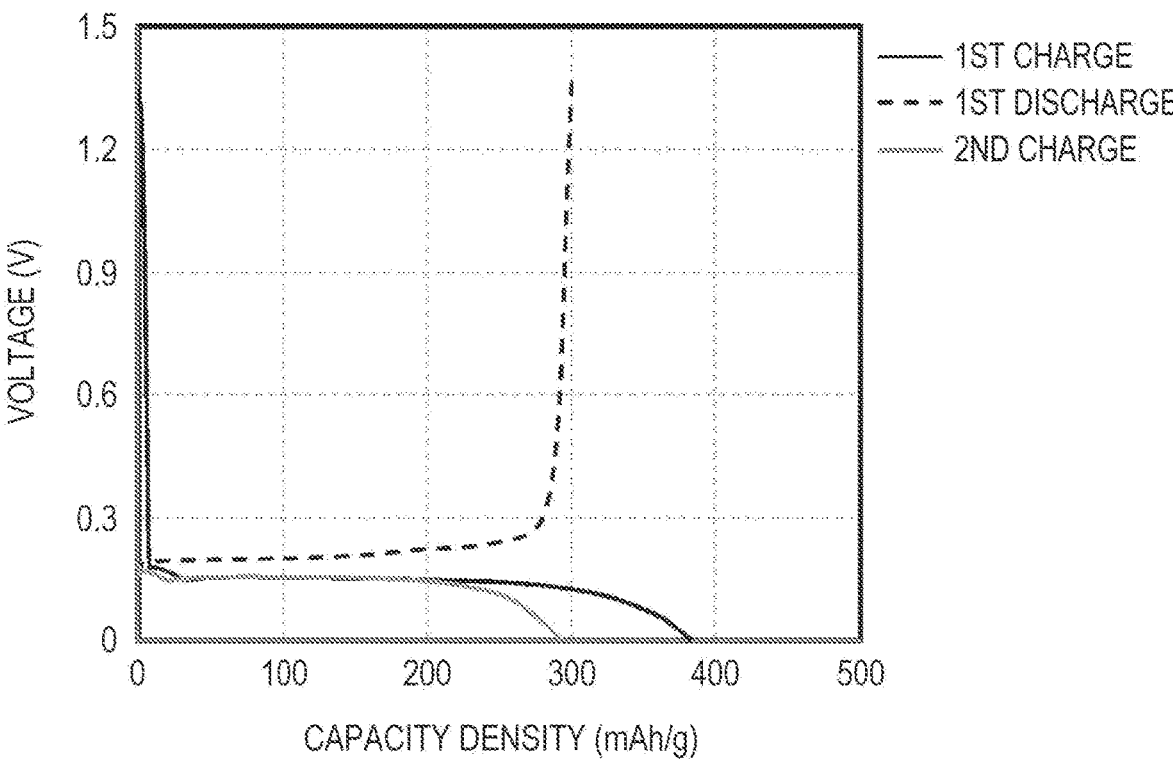
FIG. 4 is a graph showing the results of a charge-discharge test of a test cell of Example 1.

A charge-discharge test of the prepared test cell was conducted under the following conditions. Assuming that the theoretical capacity of Bi is 384 mAh/g, the cell was charged to 0 V (0.62 V vs $Li^+$/Li) at a constant current value at which the rate from the electrode weight was 0.5 IT, then discharged to 1.38 V (2.0 V vs $Li^+$/Li), and then charged to 0 V (0.62 V vs $Li^+$/Li). The test cell was tested in a constant-temperature oven at 25° C. FIG. 4 is a graph showing the results of the charge-discharge test of the test cell of Example 1. The initial charge capacity was about 380 mAh/g. The discharge capacity and the charge capacity thereafter were about 300 mAh/g.

<Charge-Discharge Cycle Test>

Figure 5:
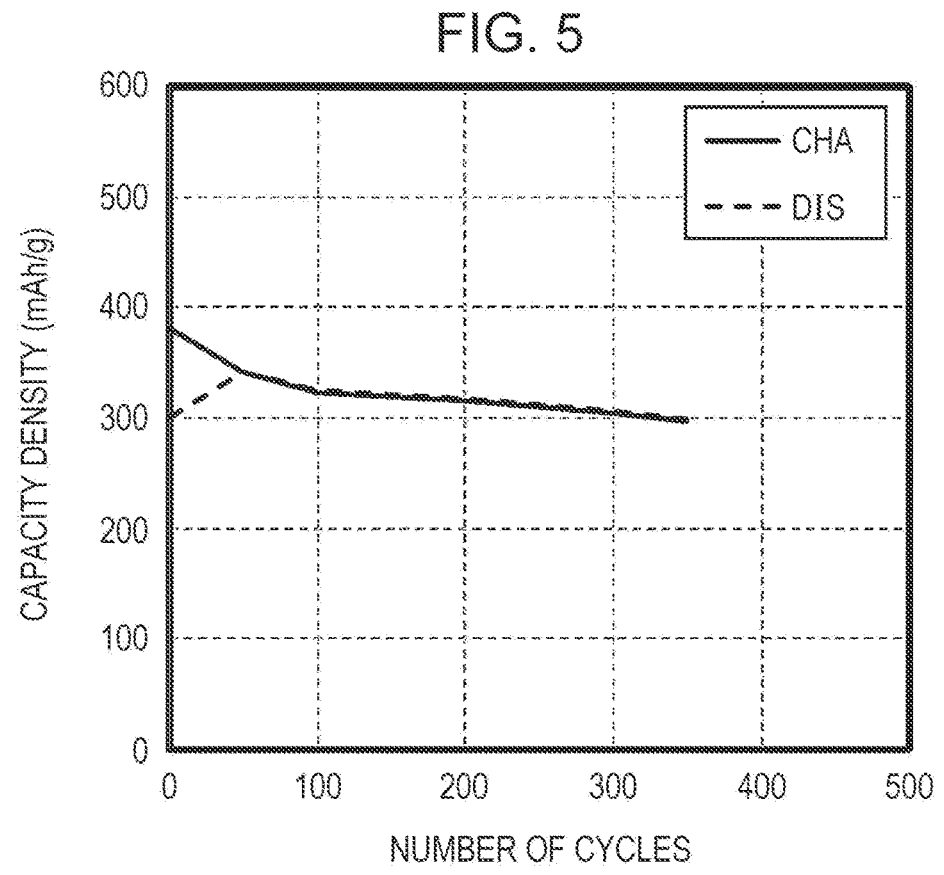
FIG. 5 is a graph showing the results of a charge-discharge cycle test of the test cell of Example 1.

The prepared test cell was subjected to a charge-discharge cycle test to evaluate the cycle characteristics, where each cycle of charging and discharging was performed under the same conditions as in the charge-discharge test. FIG. 5 is a graph showing the results of the charge-discharge cycle test of the test cell of Example 1. FIG. 5 demonstrates that a charge-discharge capacity greater than or equal to 300 mAh/g was maintained even after 300 cycles. This charge-discharge capacity corresponds to at least 78% of the theoretical capacity of Bi, 384 mAh/g.

Example 2

<Preparation of Test Cells>

A test cell of Example 2 was obtained as with the test cell of Example 1.

<Charge-Discharge Test>

Figure 6:
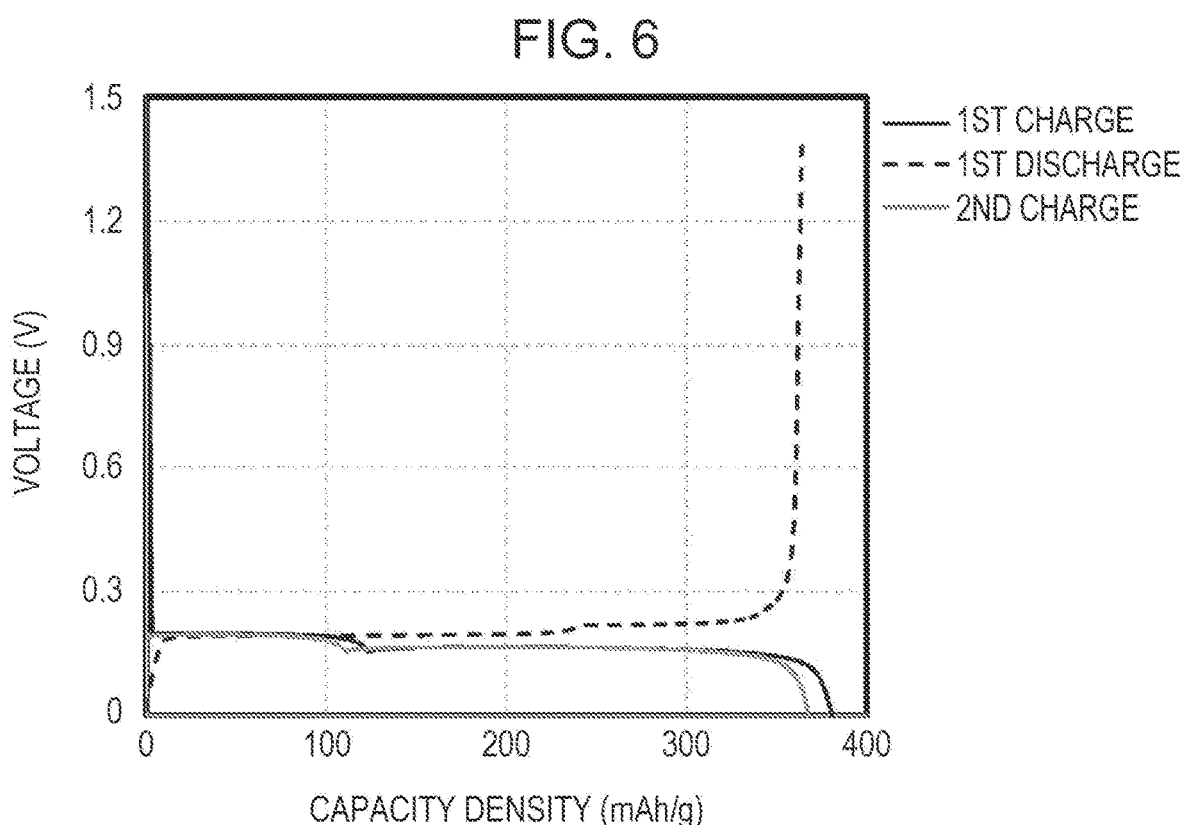
FIG. 6 is a graph showing the results of a charge-discharge test of a test cell of Example 2.

A charge-discharge test of the prepared test cell was conducted under the following conditions. Assuming that the theoretical capacity of Bi is 384 mAh/g, the cell was charged to 0 V (0.62 V vs $Li^+$/Li) at a constant current value at which the rate from the electrode weight was 0.037 IT, then discharged to 1.38 V (2.0 V vs $Li^+$/Li), and then further charged to 0 V (0.62 V vs $Li^+$/Li). The test cell was tested in a constant-temperature oven at 25° C. FIG. 6 shows the results of the charge-discharge test of the test cell of Example 2. The initial charge capacity was about 380 mAh/g. The discharge capacity and the charge capacity thereafter were about 370 mAh/g.

<Charge-Discharge Cycle Test>

Figure 7:
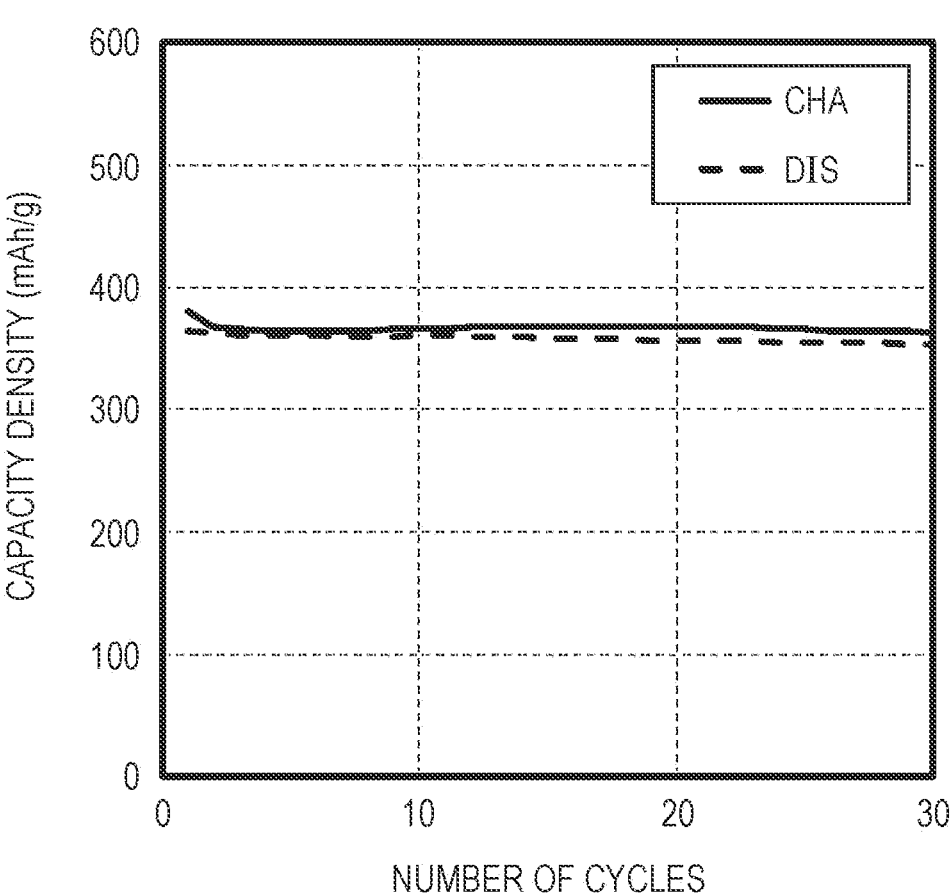
FIG. 7 is a graph showing the results of a charge-discharge cycle test of the test cell of Example 2.

The prepared test cell was subjected to a charge-discharge cycle test, where each cycle of charging and discharging was performed under the same conditions as in the charge-discharge test. FIG. 7 shows the results of the charge-discharge cycle test of the test cell of Example 2. The results indicate that a charge-discharge capacity greater than or equal to 350 mAh/g, which is at least 90% of the theoretical capacity of Bi, 384 mAh/g, was maintained even after 30 cycles.

Example 3

<Preparation of Test Cells>

A test cell of Example 3 was obtained as with the battery of Example 1 except that, instead of the solid electrolyte $Li_3YBr_4Cl_2$ (80 mg), a sulfide solid electrolyte $Li_6PS_5Cl$ (produced by Ampcera, 80 mg) was used.

<Charge-Discharge Test>

Figure 8:
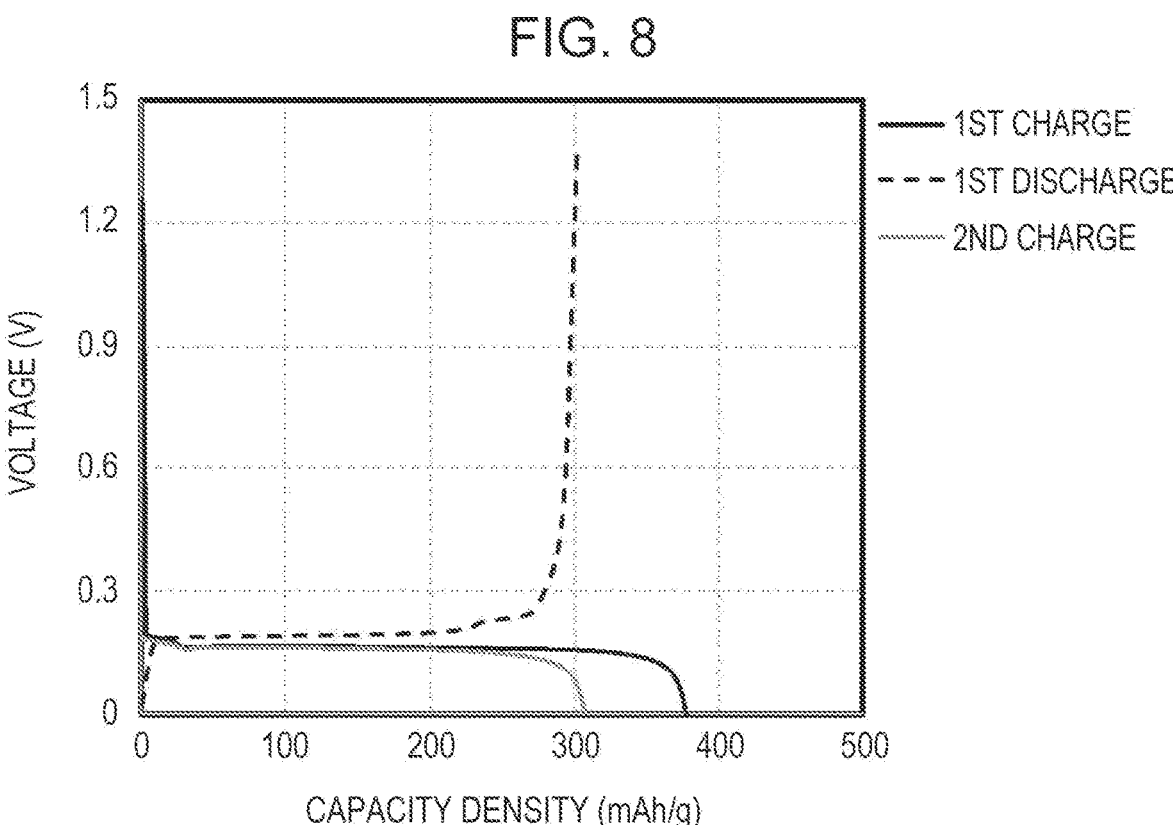
FIG. 8 is a graph showing the results of a charge-discharge test of a test cell of Example 3.

A charge-discharge test of the prepared test cell was conducted under the following conditions. Assuming that the theoretical capacity of Bi is 384 mAh/g, the cell was charged to 0 V (0.62 V vs $Li^+$/Li) at a constant current value at which the rate from the electrode weight was 0.5 IT, then discharged to 1.38 V (2.0 V vs $Li^+$/Li), and then charged to 0 V (0.62 V vs $Li^+$/Li). The test cell was tested in a constant-temperature oven at 25° C. FIG. 8 is a graph showing the results of the charge-discharge test of the test cell of Example 3. The initial charge capacity was about 378 mAh/g. The discharge capacity and the charge capacity thereafter were about 300 mAh/g.

<Charge-Discharge Cycle Test>

Figure 9:
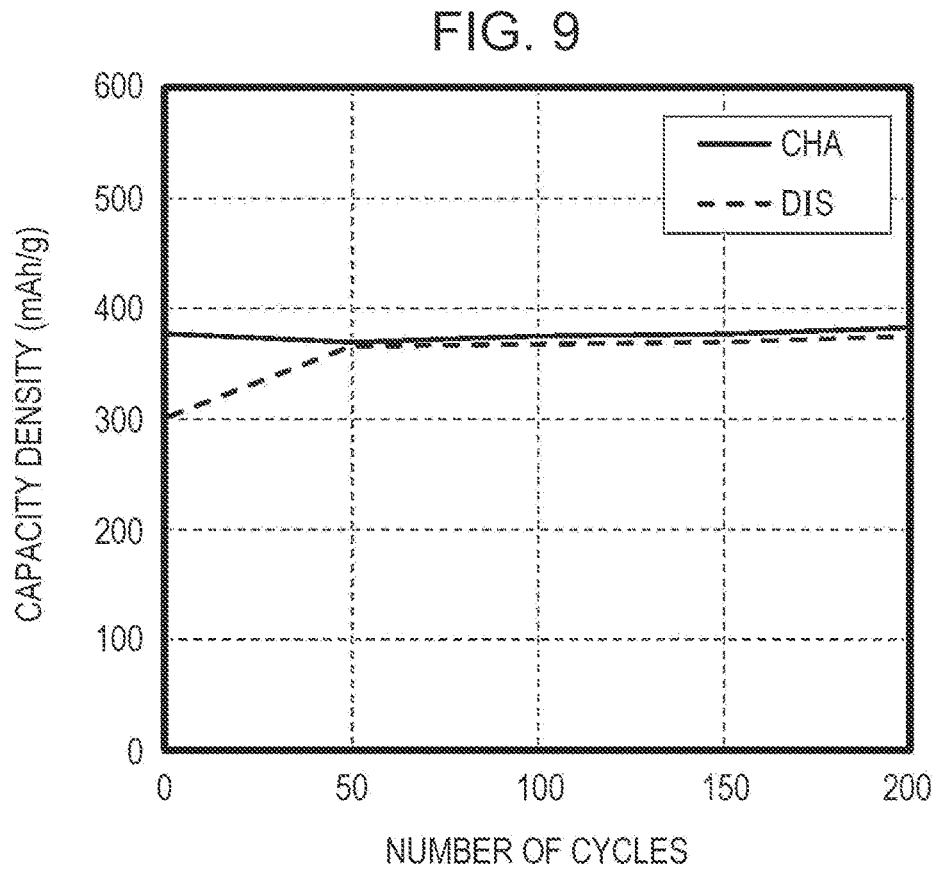
FIG. 9 is a graph showing the results of a charge-discharge cycle test of the test cell of Example 3.

The prepared test cell was subjected to a charge-discharge cycle test to evaluate the cycle characteristics, where each cycle of charging and discharging was performed under the same conditions as in the charge-discharge test. FIG. 9 is a graph showing the results of the charge-discharge cycle test of the test cell of Example 3. FIG. 9 demonstrates that a charge-discharge capacity greater than or equal to 375 mAh/g was maintained even after 200 cycles. This charge-discharge capacity corresponds to at least 97% of the theoretical capacity of Bi, 384 mAh/g.

Example 4

Figure 10:
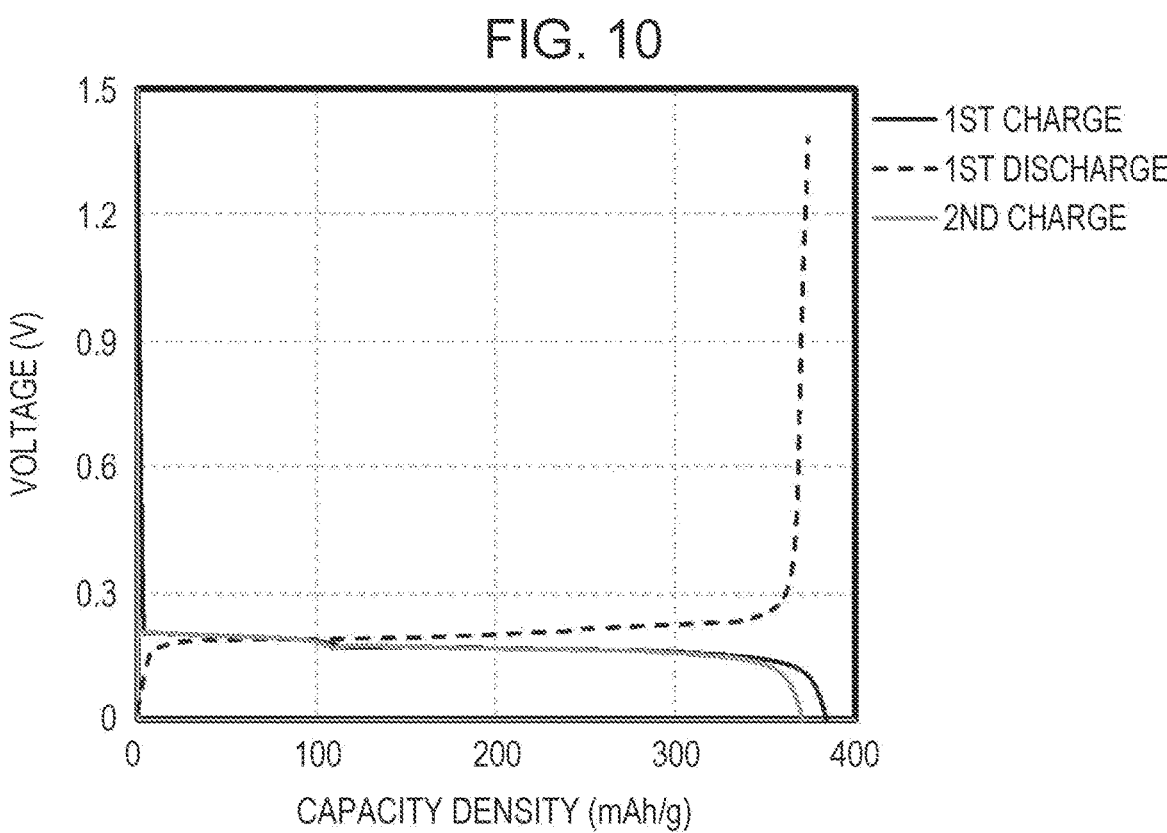
FIG. 10 is a graph showing the results of a charge-discharge test of a test cell of Example 4.
Figure 11:
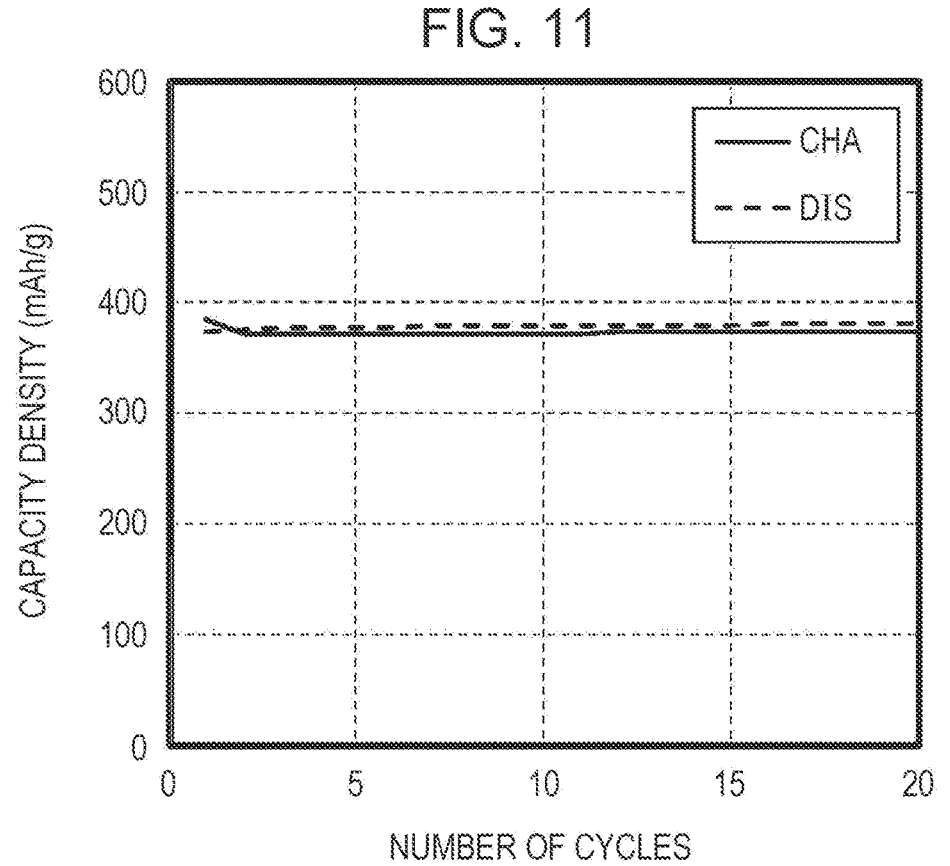
FIG. 11 is a graph showing the results of a charge-discharge cycle test of the test cell of Example 4.

A test cell of Example 4 was obtained as with the test cell of Example 3.
<Charge-Discharge Test>
A charge-discharge test of the prepared test cell was conducted under the following conditions. Assuming that the theoretical capacity of Bi is 384 mAh/g, the cell was charged to 0 V (0.62 V vs Li$^+$/Li) at a constant current value at which the rate from the electrode weight was 0.037 IT, then discharged until 1.38 V (2.0 V vs Li$^+$/Li), and then further charged to 0 V (0.62 V vs Li$^+$/Li). The test cell was tested in a constant-temperature oven at 25° C. FIG. 10 shows the results of the charge-discharge test of the test cell of Example 4. The initial charge capacity was about 384 mAh/g. The discharge capacity and the charge capacity thereafter were about 370 mAh/g.
<Charge-Discharge Cycle Test>
The prepared test cell was subjected to a charge-discharge cycle test, where each cycle of charging and discharging was performed under the same conditions as in the charge-discharge test. FIG. 11 shows the results of the charge-discharge cycle test of the test cell of Example 4. The results indicate that a charge-discharge capacity greater than or equal to 375 mAh/g, which is at least 97% of the theoretical capacity of Bi, 384 mAh/g, was maintained even after 20 cycles.

Example 5

<Preparation of First Electrode (Negative Electrode)>
After a copper foil (10 cm×10 cm, thickness: 10 μm) was preliminarily degreased with an organic solvent as a preliminary treatment, one surface of the copper foil was masked, and the copper foil was immersed in an acidic solvent to perform degreasing and to activate the copper foil surface. To 1.0 mol/L methanesulfonic acid, bismuth methanesulfonate serving as a soluble bismuth salt was added so that the Bi$^{3+}$ ion concentration was 0.18 mol/L so as to prepare a plating bath. The activated copper foil was connected to a power supply so that current could be applied, and then immersed in the plating bath. Next, the un-masked surface of the copper foil was electroplated with Bi by controlling the current density to 2A/dm$^2$ so that the thickness of the plating layer was about 5 μm. After electroplating, the copper foil was recovered from the acidic bath, the mask was removed, and the copper foil was washed with pure water and dried. Subsequently, the obtained multilayer body including a copper foil and a Bi plating layer was punched out into a φ0.92 cm piece to obtain a negative electrode that served as the first electrode.
<Preparation of Solid Electrolyte>
A solid electrolyte having a composition represented by Li$_3$YBr$_4$Cl$_2$ was obtained as in Example 1.
<Preparation of Second Electrode (Positive Electrode)>
A positive electrode that served as the second electrode was prepared as follows.
A positive electrode active material was prepared by a coprecipitation method.
The hydroxide represented by [Ni$_{0.60}$Co$_{0.20}$Mn$_{0.20}$](OH)$_2$ obtained by the coprecipitation method was heat-treated at 500° C. so as to obtain a nickel-cobalt-manganese complex oxide. The complex oxide obtained by the coprecipitation method and lithium hydroxide LiOH were dry-mixed at Li/Me=1.1 (molar ratio) and heated in an oxygen atmosphere up to 1000° C., and the resulting mixture was heat-treated for 10 hours. The heat-treated mixture was analyzed with inductively coupled plasma emission spectroscope CIROS120 (produced by SPECTRO) to derive the element ratio of the composition. The derived element ratio was Li:Ni:Co:Mn=1.04:0.59:0.20:0.19.

The positive electrode was prepared by applying a slurry containing a positive electrode active material to an aluminum foil in an argon atmosphere. The slurry containing the positive electrode active material was prepared by mixing a positive electrode active material with a solid electrolyte, a conductive aid, and a binder in an argon atmosphere and dissolving the resulting mixture in a tetralin solvent. Li$_3$YBr$_4$Cl$_2$ was used as the solid electrolyte. Carbon nanofiber VGCF (registered trademark) produced by Showa Denko K. K. was used as the conductive aid. Tuftec (registered trademark) N504, a hydrogenated styrene thermoplastic elastomer (SEBS) produced by Asahi Kasei Corporation, was used as the binder. In the slurry, the positive electrode active material, the solid electrolyte, the conductive aid, and the binder were mixed so that positive electrode active material:solid electrolyte:conductive aid:binder=75.8:21.4:0.8:2.0.

The aforementioned slurry was applied to one surface of an aluminum foil 10 μm in thickness serving as a positive electrode current collector. The positive electrode sheet constituted by the positive electrode current collector and the slurry applied thereto was dried and pressed. Subsequently, the obtained positive electrode sheet was punched out into a φ0.92 cm piece to obtain a positive electrode.
<Preparation of Test Cells>
In an insulating external cylinder having an inner diameter of 9.4 mm, the obtained φ0.92 cm positive electrode and negative electrode were stacked so that the surfaces on which layers containing the active materials faced each other and the solid electrolyte Li$_3$YBr$_4$Cl$_2$ (80 mg) was interposed between the positive electrode active material-containing layer and the negative electrode active material-containing layer. A pressure of 360 MPa was applied to the obtained multilayer body in the stacking direction to form a multilayer body that includes a positive electrode, a solid electrolyte layer, and a negative electrode. In this multilayer body, the thickness of the positive electrode was 22 m, the thickness of the solid electrolyte layer was 400 μm, and the thickness of the negative electrode was 16.5 μm.

Next, current collectors made from stainless steel were attached to the positive electrode and the negative electrode, and current collecting leads were attached to the current collectors.

Lastly, the inside of the insulating external cylinder was shut-out from the external atmosphere by using an insulating ferrule to seal the inside of the cylinder.

Figure 12:
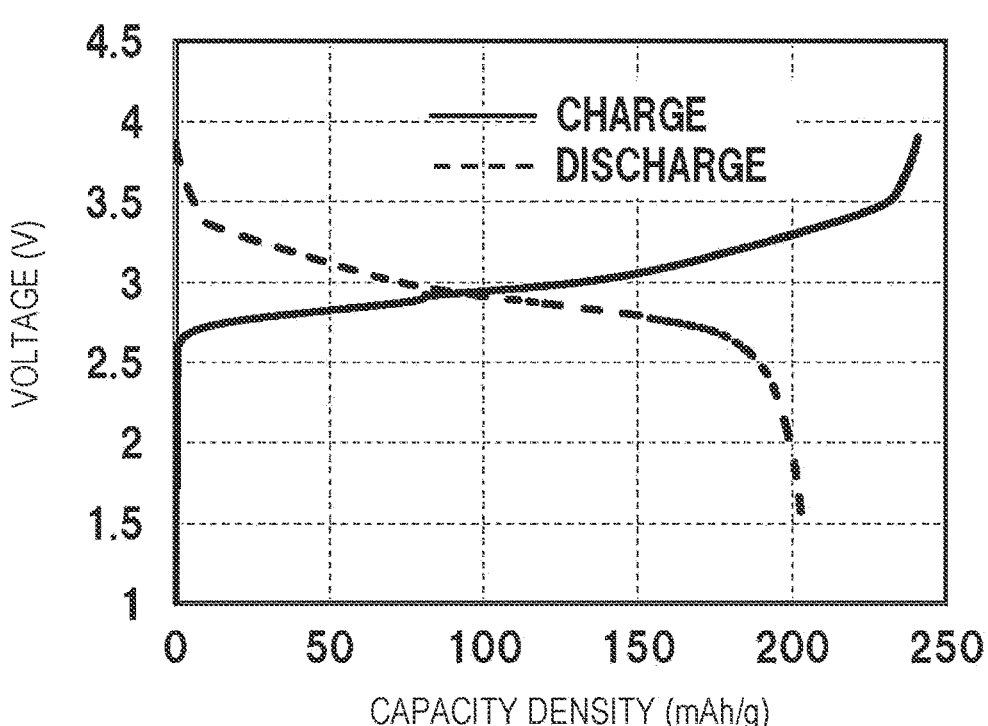
FIG. 12 is a graph showing the results of a charge-discharge test of a test cell of Example 5.

As a result, a test cell of Example 5 in which the first electrode having an active material layer made of a Bi plating layer served as a negative electrode and the second electrode served as a positive electrode was obtained.
<Charge-Discharge Test>
A charge-discharge test of the prepared test cell was conducted under the following conditions. In the test cell, the capacity of the positive electrode active material in the positive electrode was assumed to be 200 mAh/g, and the charge-discharge test was performed at a constant current value at which the charge discharge rate IT was 0.01 as specified by the positive electrode active material. The charge-discharge test was performed by charging the test cell to 3.9 V and then discharging the test cell to 1.5 V. This charge-discharge test was performed in a 85° C. constant temperature oven. FIG. 12 is a graph showing the results of the charge-discharge test of the test cell of Example 5.
<Charge-Discharge Cycle Test>

Figure 13:
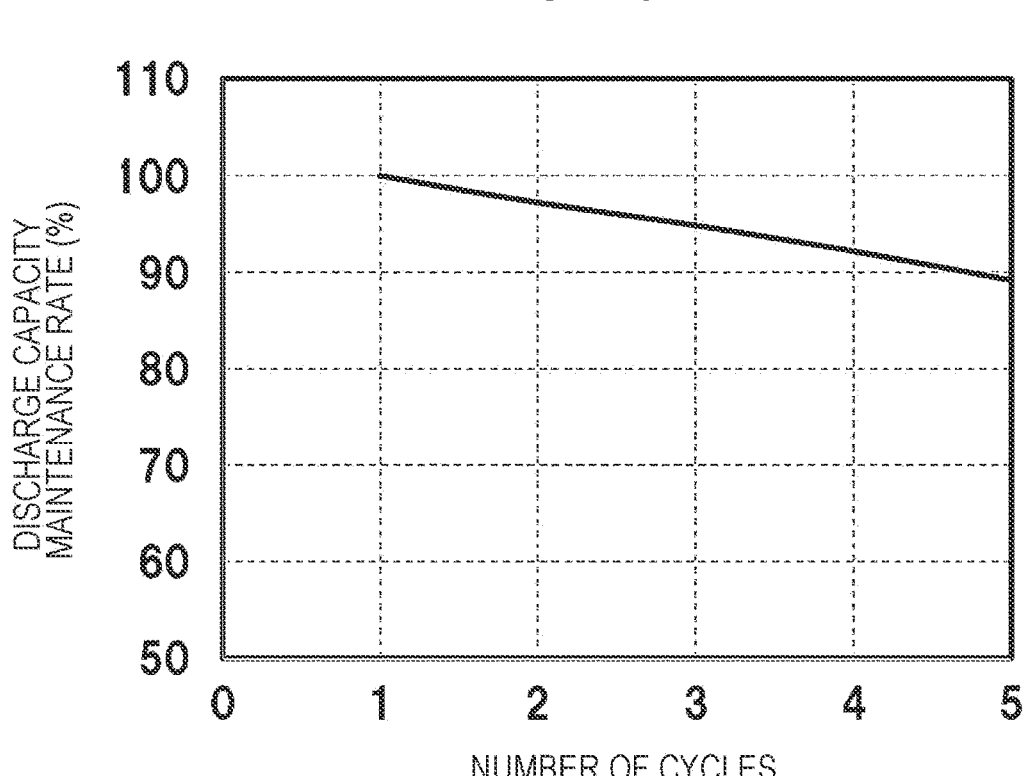
FIG. 13 is a graph showing the results of a charge-discharge cycle test of the test cell of Example 5.

The prepared test cell was subjected to a charge-discharge cycle test, where each cycle of charging and discharging was performed under the same conditions as in the charge-discharge test. FIG. 13 shows the results of the charge-discharge cycle test of the test cell of Example 5. FIG. 13 shows the discharge capacity maintenance rate up to 5 cycles relative to the initial discharge capacity in the charge-discharge cycle test. The cell of Example 5 maintained a discharge capacity greater than or equal to 89% even after 5 cycles relative to the initial value.

Example 6

<Preparation of first electrode (negative electrode)>

A negative electrode that served as a first electrode was prepared as in Example 5.
<Solid Electrolyte>

A sulfide solid electrolyte, $Li_6PS_5Cl$, produced by Ampcera Inc. was used as the solid electrolyte.
<Preparation of Second Electrode (Positive Electrode)>

In the slurry containing a positive electrode active material, the positive electrode active material, the solid electrolyte, the conductive aid, and the binder were mixed so that positive electrode active material:solid electrolyte:conductive aid:binder=81.0:16.2:0.8:2.0. Except for this point, a positive electrode that served as a second electrode was prepared as in Example 5.
<Preparation of Test Cells>

In an insulating external cylinder having an inner diameter of 9.4 mm, the obtained φ0.92 cm positive electrode and negative electrode were stacked so that the surfaces on which layers containing the active materials faced each other and the solid electrolyte $Li_6PS_5Cl$ (80 mg) was interposed between the positive electrode active material-containing layer and the negative electrode active material-containing layer. A pressure of 360 MPa was applied to the obtained multilayer body in the stacking direction to form a multilayer body that includes a positive electrode, a solid electrolyte layer, and a negative electrode. In this multilayer body, the thickness of the positive electrode was 22 m, the thickness of the solid electrolyte layer was 400 μm, and the thickness of the negative electrode was 16.5 μm.

Next, current collectors made from stainless steel were attached to the positive electrode and the negative electrode, and current collecting leads were attached to the current collectors.

Lastly, the inside of the insulating external cylinder was shut-out from the external atmosphere by using an insulating ferrule to seal the inside of the cylinder.

As a result, a test cell of Example 6 in which the first electrode having an active material layer made of a Bi plating layer served as a negative electrode and the second electrode served as a positive electrode was obtained.
<Charge-Discharge Cycle Test>

Figure 14:
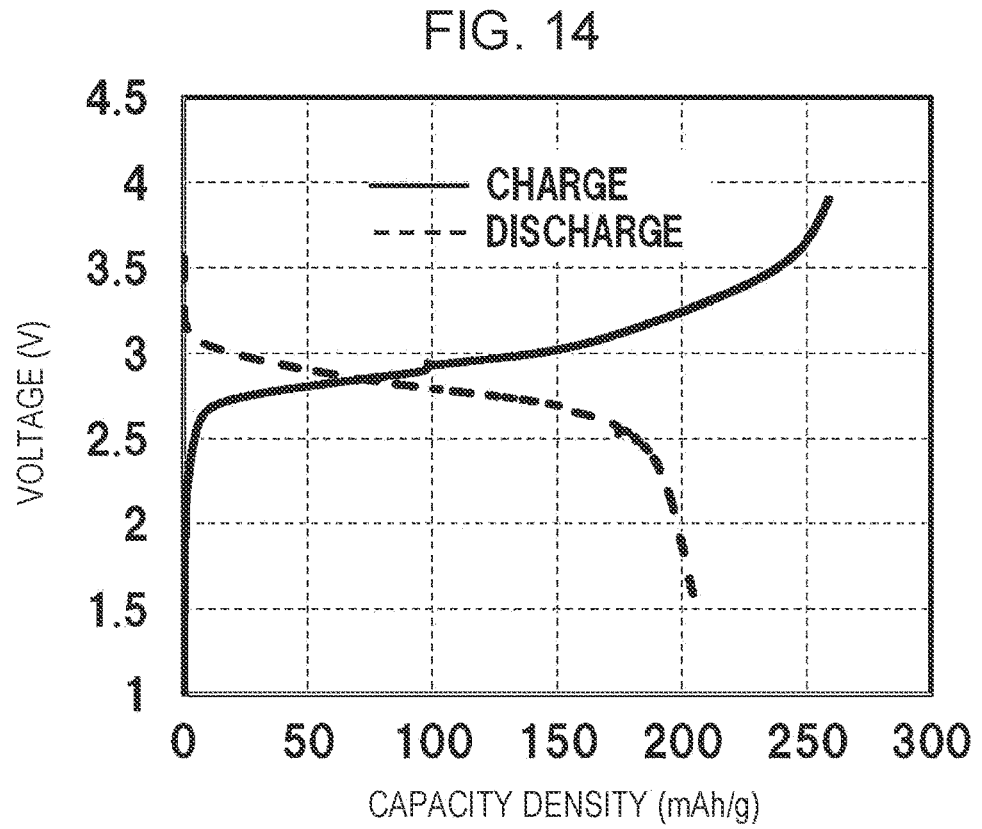
FIG. 14 is a graph showing the results of a charge-discharge test of a test cell of Example 6.

A charge-discharge test of the prepared test cell was conducted under the following conditions. In the test cell, the capacity of the positive electrode active material in the positive electrode was assumed to be 200 mAh/g, and the charge-discharge test was performed at a constant current value at which the charge discharge rate IT was 0.01 as specified by the positive electrode active material. The charge-discharge test was performed by charging the test cell to 3.9 V and then discharging the test cell to 1.5 V. This charge-discharge test was performed in a 85° C. constant temperature oven. FIG. 14 is a graph showing the results of the charge-discharge test of the test cell of Example 6.
<Charge-Discharge Cycle Test>

Figure 15:
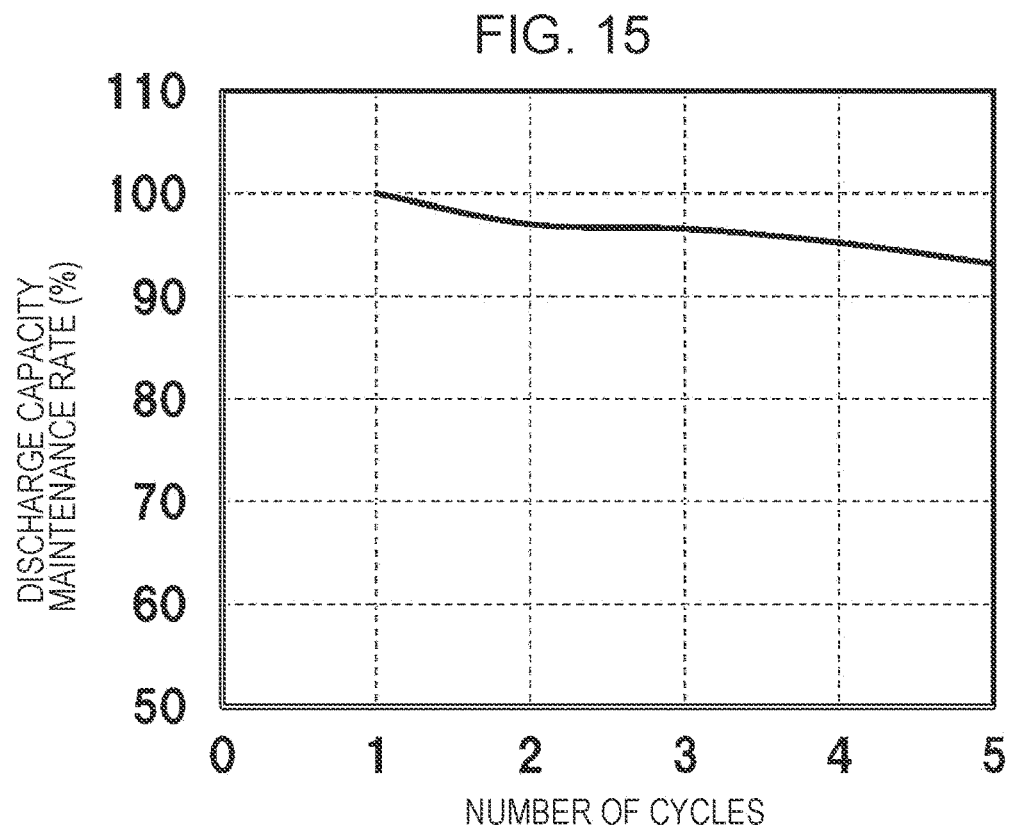
FIG. 15 is a graph showing the results of a charge-discharge cycle test of the test cell of Example 6.

The prepared test cell was subjected to a charge-discharge cycle test, where each cycle of charging and discharging was performed under the same conditions as in the charge-discharge test. FIG. 15 shows the results of the charge-discharge cycle test of the test cell of Example 6. FIG. 15 shows the discharge capacity maintenance rate up to 5 cycles relative to the initial discharge capacity in the charge-discharge cycle test. The cell of Example 6 maintained a discharge capacity greater than or equal to 93% even after 5 cycles relative to the initial value.

Example 7

<Preparation of First Electrode (Negative Electrode)>

A negative electrode that served as a first electrode was prepared as in Example 5.
<Preparation of Solid Electrolyte>

A solid electrolyte having a composition represented by $Li_3YBr_4Cl_2$ was obtained as in Example 1.
<Preparation of Second Electrode (Positive Electrode)>

A positive electrode that served as the second electrode was prepared as follows.

A positive electrode active material was prepared by a coprecipitation method. The hydroxide represented by $[Ni_{0.80}Co_{0.15}Mn_{0.05}](OH)_2$ obtained by the coprecipitation method was heat-treated at 500° C. so as to obtain a nickel-cobalt-manganese complex oxide. The complex oxide obtained by the coprecipitation method and lithium hydroxide LiOH were dry-mixed at Li/Me=1.1 (molar ratio) and heated in an oxygen atmosphere up to 1000° C., and the resulting mixture was heat-treated for 10 hours. The heat-treated mixture was analyzed with inductively coupled plasma emission spectroscope CIROS120 (produced by SPECTRO) to derive the element ratio of the composition. The derived element ratio was Li:Ni:Co:Mn=1.04:0.81:0.15:0.04.

In an argon glove box, niobium ethoxide (produced by Sigma-Aldrich Co. LLC) and lithium ethoxide (produced by Sigma-Aldrich Co. LLC) were mixed with the prepared lithium-nickel-cobalt manganese complex oxide, and the resulting mixture was dissolved in super-dehydrated ethanol (produced by FUJIFILM Wako Pure Chemical Corporation) to prepare a coating solution. In the coating solution, the mass ratio of the lithium-nickel-cobalt-manganese complex oxide, niobium ethoxide, and lithium ethoxide was lithium-nickel-cobalt-manganese complex oxide:niobium ethoxide:lithium ethoxide=6.1:1.

The prepared lithium-nickel-cobalt-manganese complex oxide was placed in a mortar, the aforementioned coating solution was added thereto and mixed, and then ethanol was evaporated to obtain a powder. The obtained powder was heat-treated at 350° C. for 3 hours to obtain a lithium-nickel-cobalt-manganese complex oxide coated with lithium niobate. The lithium-nickel-cobalt-manganese complex oxide coated with lithium niobate was used as the positive electrode active material.

The positive electrode was prepared by applying a slurry containing a positive electrode active material to an aluminum foil in an argon atmosphere. The slurry containing the positive electrode active material was prepared by mixing a positive electrode active material with a solid electrolyte, a conductive aid, and a binder in an argon atmosphere and dissolving the resulting mixture in a tetralin solvent.

$Li_3YBr_4Cl_2$ was used as the solid electrolyte. Carbon nano-fiber VGCF (registered trademark) produced by Showa Denko K. K. was used as the conductive aid. Tuftec (registered trademark) N504, a hydrogenated styrene thermoplastic elastomer (SEBS) produced by Asahi Kasei Corporation, was used as the binder. In the slurry, the positive electrode active material, the solid electrolyte, the conductive aid, and the binder were mixed so that positive electrode active material:solid electrolyte:conductive aid:binder=80.4:16.8:0.8:2.0.

The aforementioned slurry was applied to one surface of an aluminum foil 10 m in thickness serving as a positive electrode current collector. The positive electrode sheet constituted by the positive electrode current collector and the slurry applied thereto was dried and pressed. Subsequently, the obtained positive electrode sheet was punched out into a φ0.92 cm piece to obtain a positive electrode.

<Preparation of Test Cells>

In an insulating external cylinder having an inner diameter of 9.4 mm, the obtained φ0.92 cm positive electrode and negative electrode were stacked so that the surfaces on which layers containing the active materials faced each other and the solid electrolyte $Li_3YBr_4Cl_2$ (80 mg) was interposed between the positive electrode active material-containing layer and the negative electrode active material-containing layer. A pressure of 360 MPa was applied to the obtained multilayer body in the stacking direction to form a multilayer body that includes a positive electrode, a solid electrolyte layer, and a negative electrode. In this multilayer body, the thickness of the positive electrode was 22 m, the thickness of the solid electrolyte layer was 400 μm, and the thickness of the negative electrode was 16.5 μm.

Next, current collectors made from stainless steel were attached to the positive electrode and the negative electrode, and current collecting leads were attached to the current collectors.

Lastly, the inside of the insulating external cylinder was shut-out from the external atmosphere by using an insulating ferrule to seal the inside of the cylinder.

As a result, a test cell of Example 7 in which the first electrode having an active material layer made of a Bi plating layer served as a negative electrode and the second electrode served as a positive electrode was obtained.

<Charge-Discharge Test>

Figure 16:
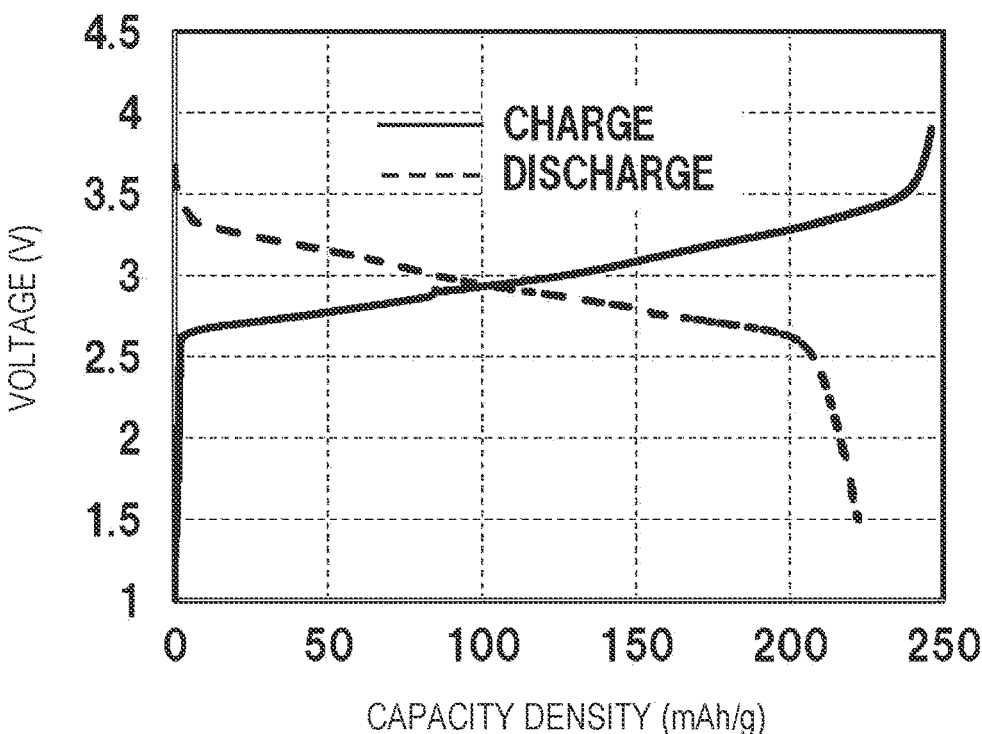
FIG. 16 is a graph showing the results of a charge-discharge test of a test cell of Example 7.

A charge-discharge test of the prepared test cell was conducted under the following conditions. In the test cell, the capacity of the positive electrode active material in the positive electrode was assumed to be 200 mAh/g, and the charge-discharge test was performed at a constant current value at which the charge discharge rate IT was 0.01 as specified by the positive electrode active material. The charge-discharge test was performed by charging the test cell to 3.9 V and then discharging the test cell to 1.5 V. This charge-discharge test was performed in a 85° C. constant temperature oven. FIG. 16 is a graph showing the results of the charge-discharge test of the test cell of Example 7.

<Charge-Discharge Cycle Test>

Figure 17:
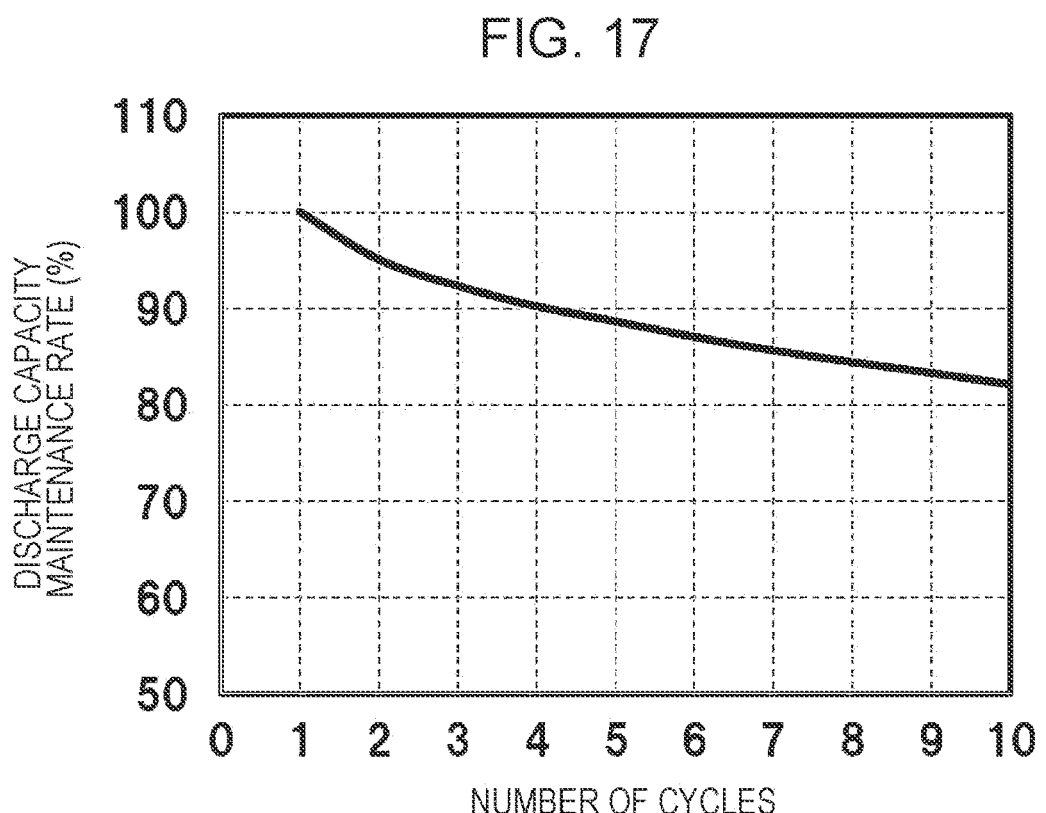
FIG. 17 is a graph showing the results of a charge-discharge cycle test of the test cell of Example 7.

The prepared test cell was subjected to a charge-discharge cycle test, where each cycle of charging and discharging was performed under the same conditions as in the charge-discharge test. FIG. 17 shows the results of the charge-discharge cycle test of the test cell of Example 7. FIG. 17 shows the discharge capacity maintenance rate up to 10 cycles relative to the initial discharge capacity in the charge-discharge cycle test. The cell of Example 7 maintained a discharge capacity greater than or equal to 80% even after 10 cycles relative to the initial value.

Reference Example 1

<Preparation of First Electrode>

A first electrode was prepared by plating one surface of a copper foil (2 cm×2 cm, thickness: 12 μm) with Bi having a thickness of 1 μm as in Example 1.

<Preparation of Test Cells>

The first electrode was used as the working electrode. A Li metal having a thickness of 0.34 μm was used as the counter electrode. The Li metal was double-coated with a microporous separator (Celgard 3401 produced by Asahi Kasei Corporation). A solution prepared by dissolving $LiPF_6$ in vinylene carbonate (VC) at a concentration of 1.0 mol/L was prepared as the electrolyte. As a result, a test cell of Reference example 1 was obtained.

<Charge-Discharge Cycle Test>

The test cell of Reference example 1 was charged at a constant current of 0.6 mA to 0 V (vs $Li^+/Li$) and then discharged to 2.0 V (vs $Li^+/Li$). This cycle was assumed to constitute one cycle, and the charge-discharge cycle test was performed 25 cycles. The battery was tested in a 25° C. constant temperature oven. Here, a constant current value of 0.6 mA ($0.15$ mA/cm$^2$) corresponds to 0.5 IT.

Reference Example 2

<Preparation of Test Cells>

A test cell of Reference example 2 was obtained as with the test cell of Reference example 1 except that the solvent of the electrolyte solution was changed to fluoroethylene carbonate (FEC).

<Charge-Discharge Cycle Test>

The test cell of Reference example 2 was subjected to the charge-discharge cycle test as in Reference example 1.

Figure 18:
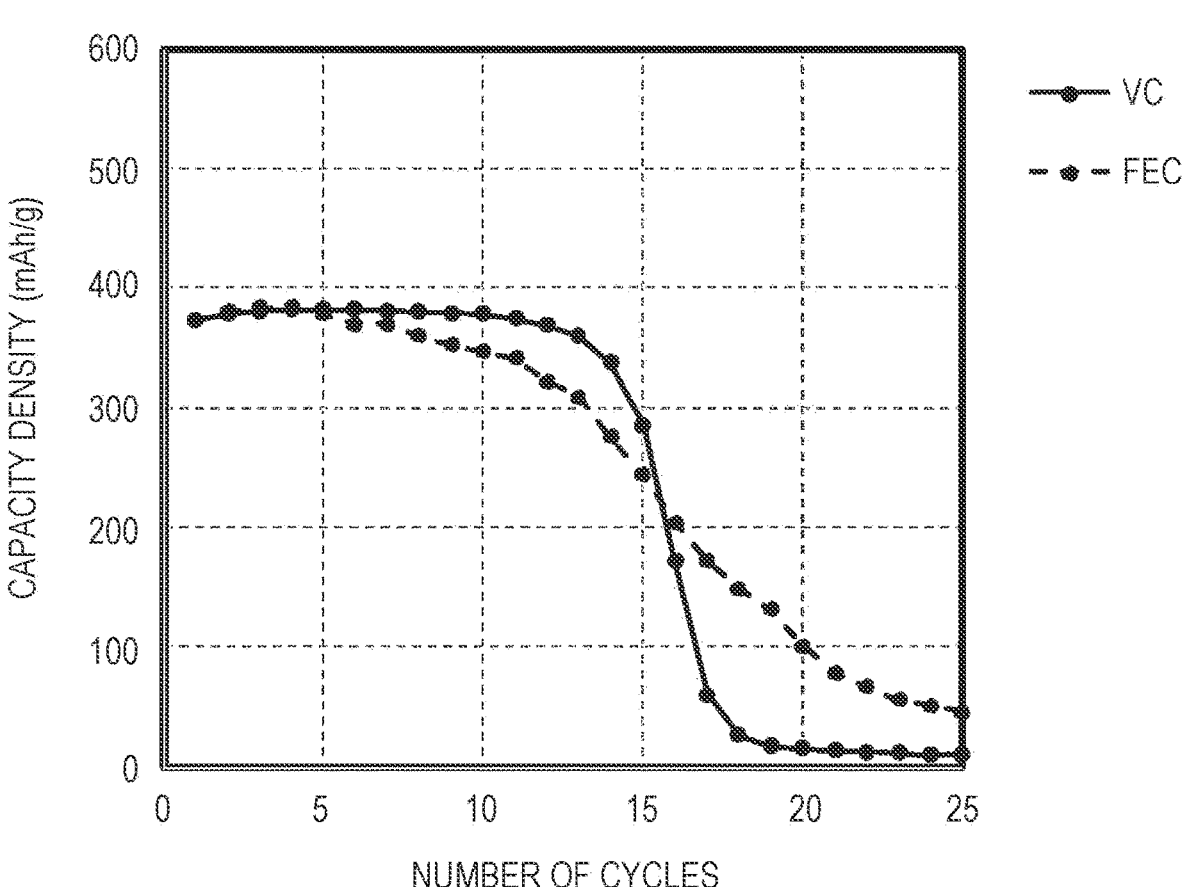
FIG. 18 is a graph showing the results of a charge-discharge cycle test of test cells of Reference examples 1 and 2.

FIG. 18 shows the results of the charge-discharge cycle test of the test cells of Reference examples 1 and 2. FIG. 18 shows that the capacities of the batteries of Reference examples 1 and 2 decreased to one third of the initial capacity or less after about 20 cycles. This is presumably because, when the Bi plating layer is repeatedly expanded and contracted by the repeated charging and discharging, the nonaqueous electrolyte solution enters voids formed in the active material layer made of the Bi plating layer, destroys the structure of the active material layer, and thereby decreases the electron-conducting paths inside the active material layer.

The aforementioned results demonstrate that the cycle characteristics of the battery improve dramatically when a solid electrolyte is used in the electrolyte layer. Examples described here use $Li_3YBr_4Cl_2$ as a halide solid electrolyte; however, the same effects can be expected from other typical solid electrolytes as well.

The battery of the present disclosure can be applied to, for example, an all-solid lithium secondary battery.

What is claimed is:

1. A battery comprising:
   a first electrode;
   a second electrode; and
   a solid electrolyte layer disposed between the first electrode and the second electrode,
   wherein the first electrode includes a current collector and an active material layer disposed between the current collector and the solid electrolyte layer, and
   the active material layer contains Bi as a main component of an active material.

2. The battery according to claim 1,
wherein the solid electrolyte layer contains a halide solid electrolyte, and
the halide solid electrolyte does not contain sulfur.

3. The battery according to claim 2,
wherein the halide solid electrolyte is a compound composed of Li, M1, and X1,
where M1 is at least one selected from the group consisting of metal elements other than Li and metalloids, and
X1 is at least one selected from the group consisting of F, Cl, Br, and I.

4. The battery according to claim 3,
wherein M1 contains Y, and
X1 contains Cl and Br.

5. The battery according to claim 1,
wherein the solid electrolyte layer contains a sulfide solid electrolyte.

6. The battery according to claim 5,
wherein the solid electrolyte layer consists essentially of a sulfide solid electrolyte.

7. The battery according to claim 5,
wherein the sulfide solid electrolyte has an argyrodite crystal structure.

8. The battery according to claim 5,
wherein the sulfide solid electrolyte is represented by a compositional formula $Li_{7-a}AS_{6-a}X2_a$,
where A is at least one selected from the group consisting of P and As, X2 is at least one selected from the group consisting of Cl, Br, and I, and a satisfies $0 \leq a \leq 1$.

9. The battery according to claim 5,
wherein the sulfide solid electrolyte is represented by a compositional formula $Li_6PS_5Cl$.

10. The battery according to claim 1,
wherein a density of the active material is greater than or equal to 6.0 $g/cm^3$ and less than or equal to 9.8 $g/cm^3$,
where, when the first electrode is a negative electrode, the density of the active material is the density of the active material in the battery in a fully discharged state, and when the first electrode is a positive electrode, the density of the active material is the density of the active material in the battery in a fully charged state.

11. The battery according to claim 10,
wherein the density of the active material is greater than or equal to 7.5 $g/cm^3$ and less than or equal to 9.8 $g/cm^3$.

12. The battery according to claim 1,
wherein, in an X-ray diffraction pattern of the active material layer obtained by surface X-ray diffraction measurement using Cu-Kα radiation, I(2)/I(1) is greater than or equal to 0.29, where I(2)/I(1) is a ratio of a height intensity I(2) of a maximum peak present in a diffraction angle 2θ range of from 37° to 39° to a height intensity I(1) of a maximum peak present in a diffraction angle 2θ range of from 26° to 28°.

13. The battery according to claim 12,
wherein I(2)/I(1) is less than or equal to 0.57.

14. The battery according to claim 1,
wherein the active material layer contains elemental Bi.

15. The battery according to claim 1,
wherein the active material layer contains at least one selected from the group consisting of LiBi and $Li_3Bi$.

16. The battery according to claim 1,
wherein the active material layer contains only elemental Bi as the active material.

17. The battery according to claim 1,
wherein the active material layer does not contain an electrolyte.

18. The battery according to claim 1,
wherein the current collector contains Cu.

19. The battery according to claim 1,
wherein the active material layer is a plating layer.

20. The battery according to claim 1,
wherein the first electrode is a negative electrode, and
the second electrode is a positive electrode.

21. The battery according to claim 1,
wherein the second electrode contains a compound represented by compositional formula (1) below:

$$LiNi_xMe_{1-x}O_2 \qquad (1)$$

where x satisfies $0 < x \leq 1$, and Me is at least one element selected from the group consisting of Mn, Co, and Al.

22. The battery according to claim 21,
wherein x satisfies $0.5 \leq x \leq 1$.

* * * * *